(12) United States Patent
DelRegno et al.

(10) Patent No.: US 8,948,207 B2
(45) Date of Patent: Feb. 3, 2015

(54) SYSTEM AND METHOD FOR TRANSPORTING TIME-DIVISION MULTIPLEXED COMMUNICATIONS THROUGH A PACKET-SWITCHED ACCESS NETWORK

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); Lee D. Bengston, Murphy, TX (US); William Drake, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 3309 days.

(21) Appl. No.: 10/860,609

(22) Filed: Jun. 3, 2004
(Under 37 CFR 1.47)

(65) Prior Publication Data
US 2005/0220148 A1 Oct. 6, 2005

Related U.S. Application Data

(60) Provisional application No. 60/560,009, filed on Apr. 5, 2004.

(51) Int. Cl.
*H04J 3/00* (2006.01)
*H04M 7/00* (2006.01)
*H04L 12/801* (2013.01)

(52) U.S. Cl.
CPC .............. *H04M 7/006* (2013.01); *H04L 47/10* (2013.01)

USPC .......................................... 370/498; 370/466

(58) Field of Classification Search
CPC ................ H04L 12/2836; H04L 12/66; H04L 29/06068; H04L 29/06027; H04L 29/06088; H04L 49/00; H04L 49/3009; H04L 49/309; H04L 51/06; H04L 51/066
USPC ......... 370/351–356, 389, 465–467, 442, 498, 370/401
See application file for complete search history.

(56) References Cited

U.S. PATENT DOCUMENTS

| | | | |
|---|---|---|---|
| 5,159,592 | A | 10/1992 | Perkins |
| 5,412,647 | A | 5/1995 | Giroux et al. |

(Continued)

FOREIGN PATENT DOCUMENTS

| | | |
|---|---|---|
| EP | 0975192 | 1/2000 |
| EP | 1065858 | 1/2001 |

(Continued)

OTHER PUBLICATIONS

Zelig, et al., "Pseudo Wire (PW) Management Information Base," [on-line] [Last visited on: Jan. 26, 2004] http://www.ietf.org/internet-drafts/draft-ietf-pwe3-pw-mib-03, pp. 1-42.

(Continued)

*Primary Examiner* — Kan Yuen

(57) ABSTRACT

A system and method are provided for providing access communications between customer locations and a core network service edge. Access flows are handled as carrier-tagged flows through a packet switched network comprising network elements that interpret and manipulate carrier tag values associated with traffic-bearing data frames. Time-division multiplexed (TDM) signals are transported as carrier-tagged flows between customer premise equipment that communicates using TDM signals and a service edge that communicates using TDM signals.

19 Claims, 16 Drawing Sheets

(56) References Cited

U.S. PATENT DOCUMENTS

| | | | |
|---|---|---|---|
| 5,805,600 A * | 9/1998 | Venters et al. | 370/477 |
| 5,809,021 A | 9/1998 | Diaz et al. | |
| 5,910,954 A | 6/1999 | Bronstein et al. | |
| 5,987,034 A | 11/1999 | Simon et al. | |
| 5,999,532 A | 12/1999 | Terasaki | |
| 6,205,488 B1 | 3/2001 | Casey et al. | |
| 6,333,917 B1 | 12/2001 | Lyon et al. | |
| 6,339,595 B1 | 1/2002 | Rekhter et al. | |
| 6,381,649 B1 | 4/2002 | Carlson | |
| 6,499,061 B1 | 12/2002 | Benayoun et al. | |
| 6,603,756 B1 | 8/2003 | Tappan | |
| 6,634,297 B2 | 10/2003 | Poetter | |
| 6,636,512 B1 | 10/2003 | Lorrain et al. | |
| 6,643,297 B1 * | 11/2003 | Sproat et al. | 370/498 |
| 6,731,649 B1 | 5/2004 | Silverman | |
| 6,735,187 B1 | 5/2004 | Helander et al. | |
| 6,775,283 B1 | 8/2004 | Williams | |
| 6,778,494 B1 | 8/2004 | Mauger | |
| 6,870,812 B1 | 3/2005 | Kloth et al. | |
| 6,898,213 B1 | 5/2005 | Shimelmitz et al. | |
| 6,904,061 B2 | 6/2005 | Schmitt et al. | |
| 6,934,250 B1 | 8/2005 | Kejriwal et al. | |
| 6,944,168 B2 | 9/2005 | Paatela et al. | |
| 6,950,393 B1 | 9/2005 | Ben Nun et al. | |
| 6,963,561 B1 * | 11/2005 | Lahat | 370/356 |
| 6,977,932 B1 | 12/2005 | Hauck | |
| 6,985,488 B2 | 1/2006 | Pan et al. | |
| 7,031,312 B1 | 4/2006 | Jayakumar et al. | |
| 7,031,607 B1 | 4/2006 | Aswood Smith | |
| 7,068,654 B1 | 6/2006 | Joseph et al. | |
| 7,092,389 B2 | 8/2006 | Chase et al. | |
| 7,120,151 B1 | 10/2006 | Ginjpalli et al. | |
| 7,126,907 B2 | 10/2006 | Carpini et al. | |
| 7,130,261 B1 * | 10/2006 | Skrzynski et al. | 370/216 |
| 7,164,692 B2 | 1/2007 | Cox et al. | |
| 7,227,867 B1 | 6/2007 | Ferguson et al. | |
| 7,289,538 B1 * | 10/2007 | Paradise et al. | 370/497 |
| 7,330,481 B2 * | 2/2008 | Jones et al. | 370/449 |
| 7,411,904 B2 | 8/2008 | Foote et al. | |
| 7,463,639 B1 | 12/2008 | Rekhter | |
| 7,480,306 B2 | 1/2009 | Unbehagen et al. | |
| 8,218,569 B2 | 7/2012 | DelRegno et al. | |
| 8,340,102 B2 | 12/2012 | DelRegno | |
| 2001/0036172 A1 * | 11/2001 | Haskal | 370/352 |
| 2002/0075542 A1 | 6/2002 | Kumar et al. | |
| 2002/0078384 A1 | 6/2002 | Hippelainen | |
| 2002/0085563 A1 * | 7/2002 | Mesh et al. | 370/393 |
| 2002/0114274 A1 | 8/2002 | Sturges et al. | |
| 2002/0126633 A1 | 9/2002 | Mizutani et al. | |
| 2002/0131408 A1 | 9/2002 | Hsu | |
| 2002/0146026 A1 | 10/2002 | Unitt et al. | |
| 2002/0150100 A1 | 10/2002 | White et al. | |
| 2002/0152319 A1 | 10/2002 | Amin et al. | |
| 2002/0163935 A1 | 11/2002 | Paatela et al. | |
| 2002/0167949 A1 | 11/2002 | Bremer et al. | |
| 2002/0176139 A1 | 11/2002 | Slaughter et al. | |
| 2003/0012184 A1 * | 1/2003 | Walker et al. | 370/352 |
| 2003/0016672 A1 | 1/2003 | Rosen et al. | |
| 2003/0021287 A1 | 1/2003 | Lee et al. | |
| 2003/0026206 A1 | 2/2003 | Mullendore et al. | |
| 2003/0043830 A1 | 3/2003 | Floyd et al. | |
| 2003/0056006 A1 | 3/2003 | Katsube et al. | |
| 2003/0112756 A1 | 6/2003 | Le Gouriellec et al. | |
| 2003/0145246 A1 | 7/2003 | Suemura | |
| 2003/0147352 A1 | 8/2003 | Ishibashi et al. | |
| 2003/0147412 A1 * | 8/2003 | Weyman et al. | 370/419 |
| 2003/0185201 A1 * | 10/2003 | Dorgan | 370/352 |
| 2003/0231640 A1 | 12/2003 | Basso et al. | |
| 2004/0028051 A1 | 2/2004 | Etemadi et al. | |
| 2004/0028064 A1 | 2/2004 | Cetin et al. | |
| 2004/0037290 A1 * | 2/2004 | Valadarsky et al. | 370/395.1 |
| 2004/0042480 A1 * | 3/2004 | Sproat et al. | 370/442 |
| 2004/0044789 A1 | 3/2004 | Angel et al. | |
| 2004/0066780 A1 * | 4/2004 | Shankar et al. | 370/389 |
| 2004/0076166 A1 * | 4/2004 | Patenaude | 370/401 |
| 2004/0081172 A1 | 4/2004 | Ould-Brahim | |
| 2004/0081203 A1 | 4/2004 | Sodder et al. | |
| 2004/0088430 A1 | 5/2004 | Busi et al. | |
| 2004/0090967 A1 | 5/2004 | Doidge et al. | |
| 2004/0123232 A1 | 6/2004 | Hodges et al. | |
| 2004/0153570 A1 | 8/2004 | Shobatake | |
| 2004/0156313 A1 | 8/2004 | Hofmeister et al. | |
| 2004/0156389 A1 | 8/2004 | Sha | |
| 2004/0158626 A1 | 8/2004 | Douglas | |
| 2004/0162919 A1 * | 8/2004 | Williamson et al. | 709/250 |
| 2004/0165600 A1 | 8/2004 | Lee | |
| 2004/0170160 A1 * | 9/2004 | Li et al. | 370/352 |
| 2004/0170167 A1 | 9/2004 | Cohen | |
| 2004/0170173 A1 * | 9/2004 | Pan et al. | 370/392 |
| 2004/0174882 A1 | 9/2004 | Willis | |
| 2004/0179555 A1 | 9/2004 | Smith | |
| 2004/0190548 A1 | 9/2004 | Harel et al. | |
| 2004/0202148 A1 | 10/2004 | Kuehnel | |
| 2004/0208198 A1 * | 10/2004 | Christie et al. | 370/467 |
| 2004/0213232 A1 | 10/2004 | Regan | |
| 2004/0221051 A1 | 11/2004 | Liong et al. | |
| 2004/0246891 A1 | 12/2004 | Kay et al. | |
| 2004/0252717 A1 * | 12/2004 | Solomon et al. | 370/466 |
| 2004/0255028 A1 | 12/2004 | Chu et al. | |
| 2005/0002333 A1 | 1/2005 | Aalders et al. | |
| 2005/0044262 A1 * | 2/2005 | Luo | 709/238 |
| 2005/0047341 A1 * | 3/2005 | Kim et al. | 370/232 |
| 2005/0141504 A1 | 6/2005 | Rembert et al. | |
| 2005/0147104 A1 * | 7/2005 | Ould-Brahim | 370/395.5 |
| 2005/0160180 A1 | 7/2005 | Rabje et al. | |
| 2005/0190757 A1 | 9/2005 | Sajassi | |
| 2006/0002419 A1 * | 1/2006 | Cox et al. | 370/445 |
| 2006/0018313 A1 | 1/2006 | Oki et al. | |
| 2006/0159019 A1 | 7/2006 | Buskirk et al. | |
| 2006/0209840 A1 | 9/2006 | Paatela et al. | |
| 2007/0274321 A1 | 11/2007 | Jonsson et al. | |
| 2007/0286198 A1 | 12/2007 | Muirhead et al. | |
| 2008/0159174 A1 * | 7/2008 | Enomoto et al. | 370/256 |
| 2009/0080431 A1 | 3/2009 | Rekhter | |
| 2009/0097490 A1 | 4/2009 | Sanderson et al. | |
| 2011/0292948 A1 | 12/2011 | Delregno | |

FOREIGN PATENT DOCUMENTS

| | | |
|---|---|---|
| EP | 1133121 | 9/2001 |
| EP | 1176774 | 6/2002 |
| EP | 1292083 | 3/2003 |
| WO | WO-98/39879 | 9/1998 |
| WO | 00/46961 | 8/2000 |
| WO | WO-00/54469 | 9/2000 |
| WO | WO-01/15386 | 3/2001 |
| WO | 01/67804 | 9/2001 |
| WO | WO-01/71986 | 9/2001 |
| WO | WO-01/91416 | 11/2001 |
| WO | 02/15475 | 2/2002 |
| WO | WO-02/51069 | 6/2002 |
| WO | WO-02/078253 | 10/2002 |
| WO | 03/005648 | 1/2003 |
| WO | WO-03/019873 | 3/2003 |
| WO | WO-03/075501 | 9/2003 |
| WO | WO-03/077146 | 9/2003 |
| WO | WO-2004/010656 | 1/2004 |
| WO | WO-2004/025904 | 3/2004 |
| WO | WO-2004/049644 | 6/2004 |
| WO | WO-2004/102890 | 11/2004 |

OTHER PUBLICATIONS

Shah, et al., "Qos Signaling for PW," [on-line] [Last visited on: May 27, 2004] http://www.ietf.org/internet-drafts/draft-shah-pwe3-pw-qos-signaling-00, pp. 1-7.

Bryant, et al., "PWE3 Architecture," [on-line] [Last visited on: May 27, 2004] http://www.ietf.org/internet-drafts/draft-ietf-pwe3-arch-06, pp. 1-34.

Xiao, et al., "Requirements for Pseudo-Wire Emulation Edge-to-Edge (PWE3)," [on-line] [Last visited on: Jan. 17, 2004] http://www.ietf.org/internet-drafts/draft-ietf-pwe3-requirements-08, pp. 1-20.

(56) References Cited

OTHER PUBLICATIONS

Martini, et al., "Pseudowire Setup and Maintenance Using LDP," [on-line] [Last visited on: Jun. 1, 2004] http://www.ietf.org/internet-drafts/draft-ietf-pwe3-control-protocol-06, pp. 1-31.
Zelig, et al., "Ethernet Pseudo Wire (PW) Management Information Base," [on-line] [Last visited on: Jan. 26, 2004] http://www.ietf.org/internet-drafts/draft-ietf-pwe3-enet-mib-03, pp. 1-21.
Zelig, et al., "Pseudo Wire (PW) Over MPLS PSN Management Information Base," [on-line] [Last visited on: Feb. 3, 2004] http://www.ietf.org/internet-drafts/draft-ietf-pwe3-pw-mpls-mib-04, pp. 1-25.
Nadeau, et al., "Pseudo Wire (PW) Virtual Connection Verification," [on-line] [Last visited on: May 27, 2004] http://www.ietf.org/internet-drafts/draft-oetf-pwe3-vccv-02, pp. 1-16.
Bonica, et al., "ICMP Extensions for Multiprotocol Label Switching," [on-line] [Last visited on: May 27, 2004] http://www.ietf.org/internet-drafts/draft-bonica-icmp-mpls-02, pp. 1-10.
Williams, Mark, "Optical Ethernet Architecture Evolution: The Logical Provider Edge," Metro Ethernet Forum (Aug. 28, 2003) pp. 1-35.
Lang, Tao, "Making the Fiber Connection," Fiberoptic Product News, vol. 19, No. 2, Reed Electronic Group, New Jersey (Feb. 2004) 2 pages.
Neogi et al., "Design and Performance of a Network-Processor-Based Intelligent DSLAM", IEEE Network, IEEE Inc., New York, US, vol. 17, No. 4, Jul. 2003, pp. 56-62.
Stein, "Pseudowire Customer Edge to Customer Edge Emulation", Pseudo-Wire Edge-to-Edge Working Group, PWE3 Internet Draft, Oct. 20, 2003.
"IEEE Standards for Local and Metropolitan Area Networks: Virtual Bridged Local Area Networks", IEEE Computer Society, Copyright 1999, IEEE Std. 802.1Q-1998.
Pretty et al., "Frame Relay Interworking with Asynchronous Transfer Mode", Global Telecommunications Conference, 1993, IEEE Houston, TX, US, Nov. 29-Dec. 2, 1993, pp. 1854-1860.
Walton, "Frame Relay to ATM Interworking" BT Technology Journal, BT Laboratories, GB, vol. 16 No. 1, Jan. 1998, pp. 96-105.
Bryant, et al., "PWE3 Architecture (draft-ietf-pwe3-arch-01)," Pseudo-Wire Edge-to-Edge (PWE3) Working Group, The Internet Society, pp. 1-42, Nov. 2002.
Bryant, et al., "PWE3 Architecture (draft-ietf-pwe3-arch-07)," Pseudo-Wire Edge-to-Edge (PWE3) Working Group, The Internet Society, pp. 1-44, Mar. 2003.
Martini, et al., "Pseudowire Setup And Maintenance Using LDP (draft-ietf-pwe3-control-protocol-14)," Network Working Group, The Internet Society, 41 pages, Dec. 2004.
Martini, et al., "Transport of Layer 2 Frames Over MPLS (draft-ietf-pwe3-control-protocol-01.txt)," Network Working Group, The Internet Society, 22 pages, Nov. 2002.
Martini, et al., "Transport of Layer 2 Frames Over MPLS, RFC 4906," Network Working Group, Internet Engineering Task Force (IEFT), http://tools.ietf.org/html/rfc4906, 42 pages, Jun. 2007.
Pepelnjak, "MPLS and VPN Architectures, CCIP Edition," Chapter 9, MPLS/VPN Architecture Overview, five pages, May 23, 2002.

\* cited by examiner

SYSTEM AND METHOD FOR TRANSPORTING TIME-DIVISION MULTIPLEXED COMMUNICATIONS THROUGH A PACKET-SWITCHED ACCESS NETWORK

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed concurrently herewith and entitled "System and Method for a Communications Access Network;"

U.S. patent application Ser. No. 10/858,501, filed on Jun. 1, 2004 and entitled "System and Method for Controlling Communication Flow Rates;"

U.S. patent application Ser. No. 10/860,803 filed concurrently herewith and entitled "System and Method for Indicating Classification of a Communications Flow;"

U.S. patent application Ser. No. 10/858,491, filed concurrently herewith and entitled "Apparatus and Method for Terminating Service Emulation Instances;"

U.S. patent application Ser. No. 10/858,503, filed concurrently herewith and entitled "Apparatus and Method for Terminating Service Emulation Instances;"

U.S. patent application Ser. No. 10/858,517, filed concurrently herewith and entitled "System And Method For Providing A Multiple-Protocol Crossconnect;"

U.S. patent application Ser. No. 10/859,057, filed on Jun. 2, 2004 and entitled "Providing Applets to Remote Devices in a Telephony Network;"

U.S. patent application Ser. No. 10/858,868, filed on Jun. 2, 2004 and entitled "System and Method for Monitoring, Controlling and Provisioning a Telecommunications Access Network;"

U.S. patent application Ser. No. 10/859,463, filed on Jun. 2, 2004 and entitled "Error Detection and Reporting;"

U.S. patent application Ser. No. 10/859,468, filed on Jun. 2, 2004 and entitled "Apparatus and Method for Testing and Fault Isolation in a Communication Network;" and U.S. patent application Ser. No. 10/858,525, filed concurrently herewith and entitled "System And Method For Managing Communications In An Access Network."

TECHNICAL FIELD

The present invention relates generally to telecommunications and, more particularly, to a system and method for implementing carrier-tagged flows in an access communications network for transporting communications formatted as time-division multiplexed signals.

BACKGROUND

A major telecommunications service provider may operate one or more very extensive communication networks serving a large number of geographically diverse sites, such as cities or metropolitan areas across a nation or across the globe. The customers of such services often include medium to large business enterprises who have a need to communicate data, voice, video and other forms of traffic. Communications services may span between different sites belonging to a single business enterprise or may include communications between separate business enterprises in support of a business-to-business relationship. A communication service may also connect customers to public networks, such as the public telephone network or to the Internet.

Large communications networks often employ a hierarchical arrangement by which to aggregate, transport and distribute traffic. The portion of the network that carries the highest level of aggregated traffic is often referred to as being the service provider's "core" or "backbone" network. The core network provides long-distance transport of communications among the vast number of endpoints served by the network and may provide a very high volume of communications, particularly between areas where traffic is highly concentrated.

Traditionally, it has been more practical for a core network service provider to operate a few strategically-placed facilities to serve a large number of customers in a given region rather than to extend the service provider's core network to every physical location where customers may reside.

Consequently, although a core network serves a large number of end users, most customer endpoints are not coupled directly to the core network but instead connect through intervening facilities, such as an access link or an access network, to reach a point where the core network is accessible, referred to as a "service edge." Customer sites in the vicinity of a service provider's edge, or an intermediate hub that provides connection to the service edge, must be connected to the service edge via some form of access link or access network. An access network extends the geographical coverage of the communications service and may also aggregate communications traffic from many customer locations.

Establishing an access link may involve installing a coaxial cable or fiber-optic cable between a customer site and service edge or local hub. Often, however, the existing facilities of a local telephone carrier are leased to provide this connectivity. This usually provides at least a twisted-pair subscriber loop connection to virtually every potential customer location in a metropolitan area. In the case of larger business locations and multi-tenant commercial sites, local telephone facilities typically comprise a large quantity of telephone wires or even provide for wideband access.

For reference, FIG. 1 provides a network diagram 10 depicting a typical prior art access network arrangement by which customer equipment located in one or more buildings 20a-20c may be coupled to various service edge components 65. The service edge components may collectively be viewed as being a service edge representing a variety of core networks denoted by service networks 80, 82 and 84. Components 65 may comprise routers, switches, gateways or the like. In some implementations, or with respect to certain customer connections, there may be a greater or lesser number of aggregation stages or transport hops between customer premise equipment (CPE) and a given service edge.

Service networks 80, 82 and 84 may be any variety or combination of Internet Protocol (IP) networks, ATM/FR networks, TDM networks or the like. Although a single access network arrangement is shown for illustration in FIG. 1, each service network will generally comprise a number of service edges coupled to access networks in a similar arrangement to reach a vast number of customer sites on a national or global scale.

The services required by customers may vary greatly in the type of access services, bandwidth, quality of service (QoS), type of legacy equipment and other aspects. Types of services typically include frame relay services, asynchronous transfer mode (ATM) services, broadband services, point-to-point private line services, voice services, and the like. Accordingly, the access service provider must be prepared to provide many types of services to customers of various sizes and needs.

Furthermore, an access network must be capable of meeting the customers' current and future needs in terms of bandwidth, QoS, and the like. For example, a given customer may start with relatively small bandwidth needs yet expand to needing high-bandwidth connections such as a SONET OC-3 or OC-12 connection. Additionally, customers may require ATM services and frame relay services to support legacy systems while concurrently implementing newer applications and communications that are based on IP and Ethernet protocols.

According to the needs of various customers, the type and bandwidth of traffic from each building 20a, 20b and 20c may vary. For example, building 20a is shown to comprise an ethernet CPE 21, which may actually represent a local area network involving routers, switches, bridges, servers and workstations of a customers network. Ethernet CPE 21 may be coupled to a service edge for the purposes of providing virtual private LAN service, Internet connectivity, voice-over-IP communications, and the like. Building 21 also depicts a frame relay CPE 24 representing a need to provide for frame relay connectivity to a service edge. This is shown to be accomplished through an M13 multiplexer in a typical arrangement wherein a few DS0 TDM channels may be used in parallel to support frame relay traffic. The multiplexer serves to groom these DS0 channels as part of, for example, a larger DS1 or DS3 TDM signal. Building 21 is shown to be coupled through an optical link or optical ring 30 to a metro hub 50. Add/drop multiplexers (ADM) 22, 51 are employed along the optical ring 30 to insert and drop traffic along the ring so that building 20a and metro node 50 are coupled through one or more optical communication signals. Both the ethernet CPE 21 and frame relay CPE 24 are shown to provide traffic through ADM 22. In practice, a particular model of ADM 22 may be ill-suited for carrying both ethernet and TDM traffic, so it is often the case that multiple optical rings or links 30 must be provided to a building to accommodate mixtures of traffic types, even if each of the individual optical connections is only partially utilized.

Metro node 50 and Metro/LD hub 60 represent levels of aggregation of traffic that might occur as traffic enters from, or is distributed to, a large number of customer sites over a geographic region in connection with a given service edge. For example, a metro node 50 may serve a number of buildings in a metropolitan area, whereas a number of such metro nodes 50 may, in turn, "feed into" a Metro/LD hub 60. The aggregate flows handed to the service edge at Metro/LD hub 60 may represent traffic pertaining to tens of thousands of users or customers scattered among hundreds of buildings in one or more metropolitan areas.

The coupling between building 20a and metro node 50 represents what may be termed an "on network" situation, where in a direct optical or electrical communications link is available to reach the building. In some cases, it is practical or cost effective for a core network service provider to install and operate such connectivity to a customer location. More often, however, the existing facilities of a telephone local exchange carrier are leased to provide his connectivity in what is referred to as an "off network" arrangement, as depicted by the coupling of buildings 20b and 20c through LEC 40. The connection 41 through a LEC is often a T1 (1.544 Mbps) or a DS3 (45 Mbps) TDM communications link.

Obtaining a T1 communications link is costly and time-consuming. There are usually delays in establishing the connection because it involves some manual installing of equipment and patching of cables at various points in the local access network. From a core network service provider's perspective, leasing an access line from another party can be one of the most expensive aspects of providing a communication service. Each T1 line that must be leased represents an initial cost for installation and an ongoing cost for leasing the line on a continuous basis. These costs are particularly high considering that this increment of bandwidth of around 1.5 Mbps is relatively small by today's standards, especially now that 100 megabit-per-second LANs are commonplace even in the home.

Furthermore, as the needs of a customer or site expand over time, it may be necessary to increase available bandwidth in the connection to the provider edge. A given customer may initiate service with relatively small bandwidth needs yet, in a very short period, the needs may expand to necessitate high-bandwidth connections such as a SONET OC3 or OC12 connection. In accordance with practices common in the prior art, an increase in bandwidth may be achieved by ordering another T1 or DS3 facility which typically involves physical manipulation of cables and equipment at various sites, often delaying the implementation of additional bandwidth by several days. This is also disadvantageous in that, even if only a small incremental additional bandwidth is required, an entire T1 or DS3 must be established and maintained. This involves substantial capital expense and ongoing operating expense for a facility that will be underutilized. The increments by which bandwidth may be upgraded are, in some sense, very coarse.

At metro node 50, signals from various buildings physically converge at a distribution frame, such as the manual DS3/fiber distribution frame 52, where access paths may be patched together. A wideband crossconnect switch 53 and a narrowband crossconnect 54 are provided in metro node 50 for the purposes of grooming and manipulating traffic, such as DS0s carrying frame-relay traffic mentioned earlier. Distribution frame 52 represents at least one point at which a considerable amount of manual effort is required to patch cables in order to provision connections between customers and a service edge. Moreover, crossconnects 53 and 54 are indicative of extensive measures to deal with the channelized nature of the TDM communications which are typically used for access networks, as will be described shortly.

To continue in the direction of progressively greater aggregation, optical connection 59 represents an optical link or an optical ring, perhaps shared by one or more metro nodes 50 as a conduit for aggregate flows to be communicated with one or more Metro/LD hubs 60. At Metro/LD hub 60 traffic is selectively redirected to service edge equipment corresponding to the appropriate service network 80, 82 and 84. At Metro/LD hub 60, various ADM's 55 and 66 are used to couple traffic to and from optical connection 59. Once the traffic that was optically multiplexed upon optical connection 59 has been extracted and separated at hub 60, each signal enters a manual DS3/fiber distribution frame 62 which is coupled to wideband and narrowband crossconnect switches 63 and 64, respectively. As in the case of the metro node 50, these components represent further manual provisioning and the use of cumbersome techniques and expensive equipment to deal with deeply channelized TDM communications being adapted for carrying data.

As illustrated in FIG. 1, prior art provisioning often involves a great deal of manual cable patching at various sites, along with configuring a variety of equipment, including the various ADMs, cross connects, switches, etc. In a typical scenario, it is not unusual for a path between a customer site and a service edge to comprise more than 20 "touch points," that is, places where a cable must be manually plugged in or equipment must be manually configured in some way. Dispatching personnel to perform these actions is costly, time-consuming and error prone.

Another noteworthy inefficiency imposed by using TDM connections to reach a service provider edge relates to the concept of "deep channelization." For example, a DS3 signal carries 28 DS1 channels and, in turn, each DS1 carries 24 DS0s. Carrying a customer traffic flow that occupies one or a few DS0s requires multiplexing equipment and low level crossconnects to route the traffic independently of the other flows that may occupy the remainder of the DS0 and DS1 channels in the composite DS3 signal.

It is common practice to provide ATM services to a customer by using four DS0 TDM circuits in an inverse multiplexing arrangement. This means that, in addition to transferring ATM traffic to TDM traffic using special equipment at the customer end, the separate DS0 circuits must each be managed, provisioned and groomed in the service provider's network to reach their proper common destination. This handling requires expensive narrowband/wideband crossconnect switches and multiplexing equipment. These complicated manipulations are a consequence of fitting ATM onto TDM-oriented access network signals.

Yet another inefficiency of using TDM channels for data access communications relates to the bursty nature of many types of data communications (file transfers, Internet sessions, etc.) By design, TDM circuits are well-suited for handling inherently constant bit rate communications. But when carrying data traffic, channels which are momentarily idle cannot lend bandwidth to better accommodate traffic within other channels which are heavily burdened. Instead, channels must be provisioned for constant or maximum anticipated data rates and thereafter occupy reserved bandwidth even when not actually being used to carry traffic.

Thus, the traditional style of fulfilling a variety of access needs using traditional TDM links imposes many undesirable constraints hindering efficient and effective service to customers. The alternative of accommodating each type of access communication protocol over separate, dedicated access facilities also increases the costs and management burden on a service provider. Thus, a primary concern for network providers is simplifying the handling of many diverse traffic flows and improving the overall efficiency and scalability of the access network.

SUMMARY

The present invention relates to access arrangements that overcome the difficulties encountered by prior art approaches. In accordance with a preferred embodiment, access communications take place through a packetized transport which eliminates manual provisioning and avoids the limitations and complexities of deeply channelized TDM links. In this manner, provisioning of pathways through the access network is simply a matter of altering switching, routing or forwarding tables among elements that handle the traffic. This can be done quickly, remotely, automatically and in substantial contrast to manual provisioning practices of the prior art.

Another aspect in accordance with a preferred embodiment of the present invention relates to the carrying of various types of customer traffic in the form of carrier-tagged flows and the use of efficient network elements that handle access traffic by interpreting and manipulating carrier tag values applied to the traffic. In accordance with exemplary embodiments of the present invention, TDM communications between a TDM-conversant customer premise equipment and a TDM-conversant service edge may be efficiently carried as carrier-tagged communications along a packet-switched communications path. Furthermore, the packet-switched communication path may be implemented in the context of a TDM layer 1 transport, such as a SONET optical link.

In accordance with an exemplary embodiment of the present invention a method provides access communications between a customer premise equipment and a service edge, the method comprising receiving from the customer premise equipment a communication according to a first time-division multiplexed signal format; converting the first communication to a carrier-tagged communication; sending the carrier-tagged communication as a packet-switched communication along a packet-switched communication path; converting the carrier-tagged communication to a second communication according to a second time-division multiplexed signal format; and sending the second communication to the service edge.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
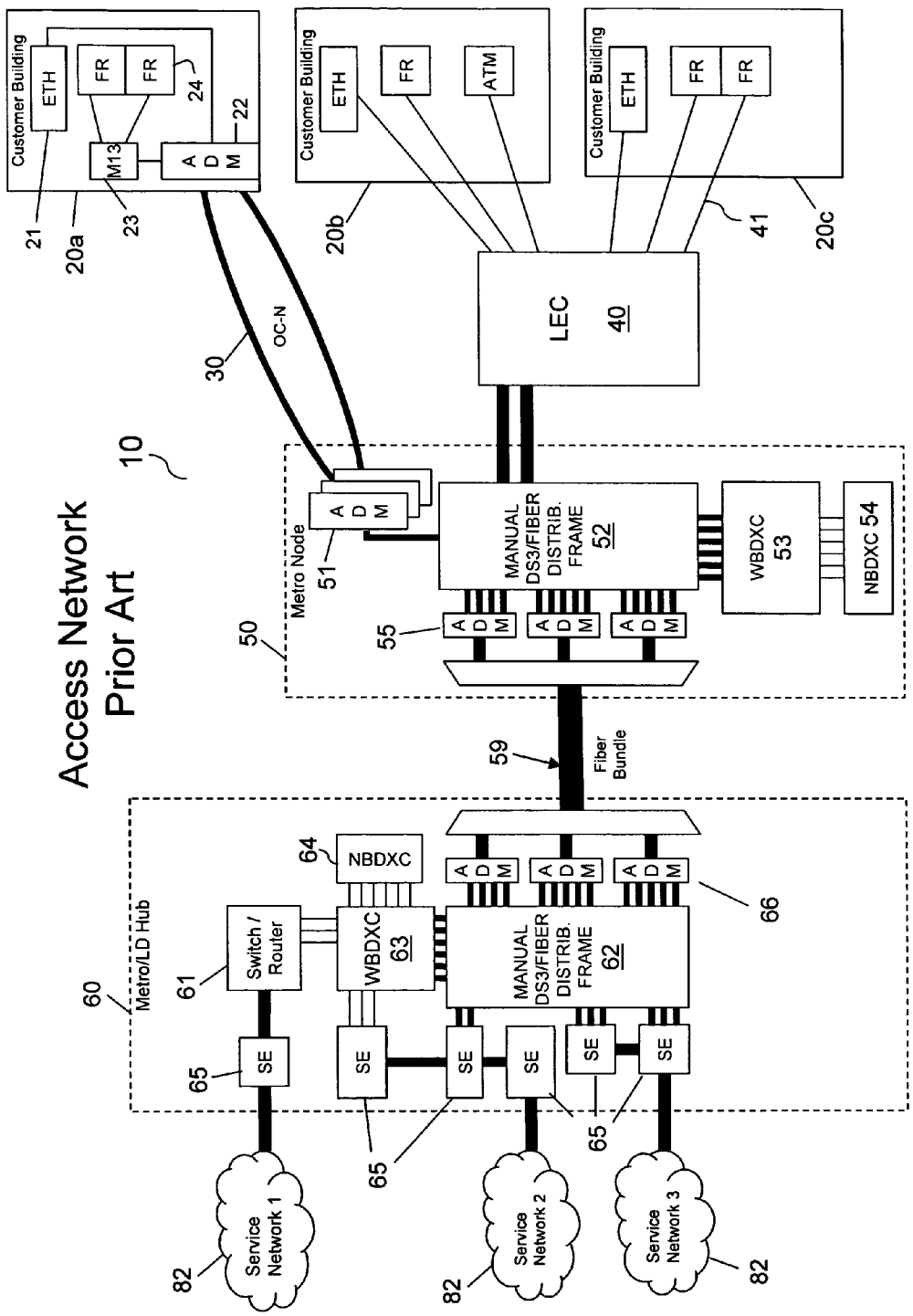
FIG. 1 illustrates a simplified diagram of a prior art access network.

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely, providing aggregation services to one or more customers in an office building communicatively coupled to a telecommunications network via a communications link, for example a DS3 link. The invention may also be applied, however, to other types of devices, networks, communications links, and the like. Furthermore, while specific network configurations are illustrated and discussed herein, it is noted that network configurations may vary to include fewer or additional elements, such as routers, gateways, bridges, ATM switches, frame relay switches, network management and control systems and the like. The illustrated embodiments are provided for illustrative purposes only and are provided only to aid in the explanation and understanding of the concepts of the present invention. Aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

As stated before, the present invention provides for access arrangements that overcome the difficulties encountered by prior art approaches. In accordance with the present invention, access communications may take place through a packetized transport, reducing or eliminating manual provisioning and avoiding the limitations and complexities of deeply channelized TDM links. Provisioning of pathways through the access network becomes a matter of associating tag values with the traffic and altering the switching tables of elements that handle the traffic based on the tag values. This can be done quickly, remotely and/or automatically, in dramatic contrast to manual provisioning practices of the prior art.

In accordance with an exemplary embodiment, the present invention may offer particular advantages derived from a manner in which packet transport may be implemented. Some designs have been proposed in the industry for straightforwardly applying common packet networking approaches to extend a service provider's packet-switching facilities outward towards, and even into, the customer premise. This moves the complexity of the provider edge to each customer premise, or at least to larger sites having significant traffic needs. Unfortunately, this approach dramatically increases the burden on the service provider in installing and maintaining an extremely large number of expensive facilities, like border routers or gateways, corresponding to every extended presence created by this architectural approach. This approach may be costly and may exhibit poor scalability and maintainability.

Various embodiments of the present invention may accomplish packetized transport across the access link in a manner that avoids some of these drawbacks. Depending on implementation, the present teachings as applied to communications access networks may provide for significantly improved efficiencies, reduced capital and operating costs, increased flexibility and responsiveness of the access network for the benefit of the customer, or a combination thereof. The present invention is not limited to achieving these particular advantages or from exhibiting other improvements over the prior art.

In accordance with a preferred embodiment of the present teachings, customer traffic is transported in a manner that does not require that traditional bridges, switches, or IP routers be used to handle traffic between the customer premise and service edge. In accordance with a preferred embodiment of the present in invention, the access network elements are of a greatly simplified and cost-effective design which process customer traffic in the form of carrier-tagged flows.

A carrier tag value is a value that is associated with, or applied to, customer traffic to identify each flow and to affect how each flow is processed through the access network. Depending on implementation, a carrier tag value may be viewed as specifying a communications path. Traffic-bearing packets or frames that are to travel along a given path are identified by a carrier tag value indicative of the path. In an alternative implementation or an alternative point of view, a carrier tag value may be construed as identifying a customer flow as distinct from other flows. Yet another way of considering the significance of a carrier tag value relates to a per-hop behavior that network elements are to carry out responsive to the carrier tag value. These interpretations are not necessarily mutually exclusive. By the interpretation and manipulation of one or more carrier tag values in customer traffic, each access network element in accordance with the present teachings determines how to route traffic between customer premise and service edge, or how to otherwise process traffic. Thus, the access network elements need not be aware of customer-applied layer two or layer three addresses (referring to the OSI reference model) which may be present in customer data payload. The access network elements need not serve as bridges or layer two or layer three terminating points with respect customer traffic. Put simply, an access network in accordance with a preferred embodiment of the present invention may be transparent to the customer payload.

Normally, the implementation of packetized communications using, for example, the type of IP/ethernet protocols which are commonplace in LAN/WANs, would require establishing a network of bridges, switches or routers to the customer premise. With this approach, the access network would begin to function much like a local-area network or metro area network of sorts. For a given customer flow, some or all of the network elements would act as typical LAN bridges, for example, meaning that they would participate along with CPE devices in learning each others' MAC addresses, maintaining forwarding tables, participating in spanning tree protocol, etc. Taking this straightforward approach of applying packet network methodologies to an access network would introduce considerable burden on the service provider. Effectively, the service provider would have extended much of the complexity of the service edge outward to the customer edge and encompassed a vastly greater number of network elements and routing tables to maintain. Furthermore, the aggregate volume of flows that would have to be dealt with in the access network would tend to overwhelm all but the most expensive, highest capacity switches or routers that are normally only justifiable for use in the core network.

Contrary to this approach, with present teachings provide that network elements may handle customer traffic flows superficially such that no bridging behavior, such as MAC learning, is required. Instead, customer traffic flows of all types are handled transparently through the access network. Consequently, a customer data frame or packet, when encapsulated and transported through an access network in accordance with the present teachings, may carry an embedded data link layer address, such as a MAC address, that corresponds to a port on a service edge or corresponds to some other remote element other than one of the access network elements. It may be said that the customer networks or CPE devices effectively 'see' the service edge as another host device on the local LAN and are oblivious to the presence of the access network. Thus, the access network elements do not have to 'terminate' all customer traffic from a layer 2 perspective and do not have to behave as bridges or routers in the usual sense.

The use of the packet-switched network as a foundation for an access network also enables the implementation of recent technologies, such as pseudowires, wherein a packet-switched network may be used to emulate virtually any other type of layer one or layer two transport.

Figure 2:
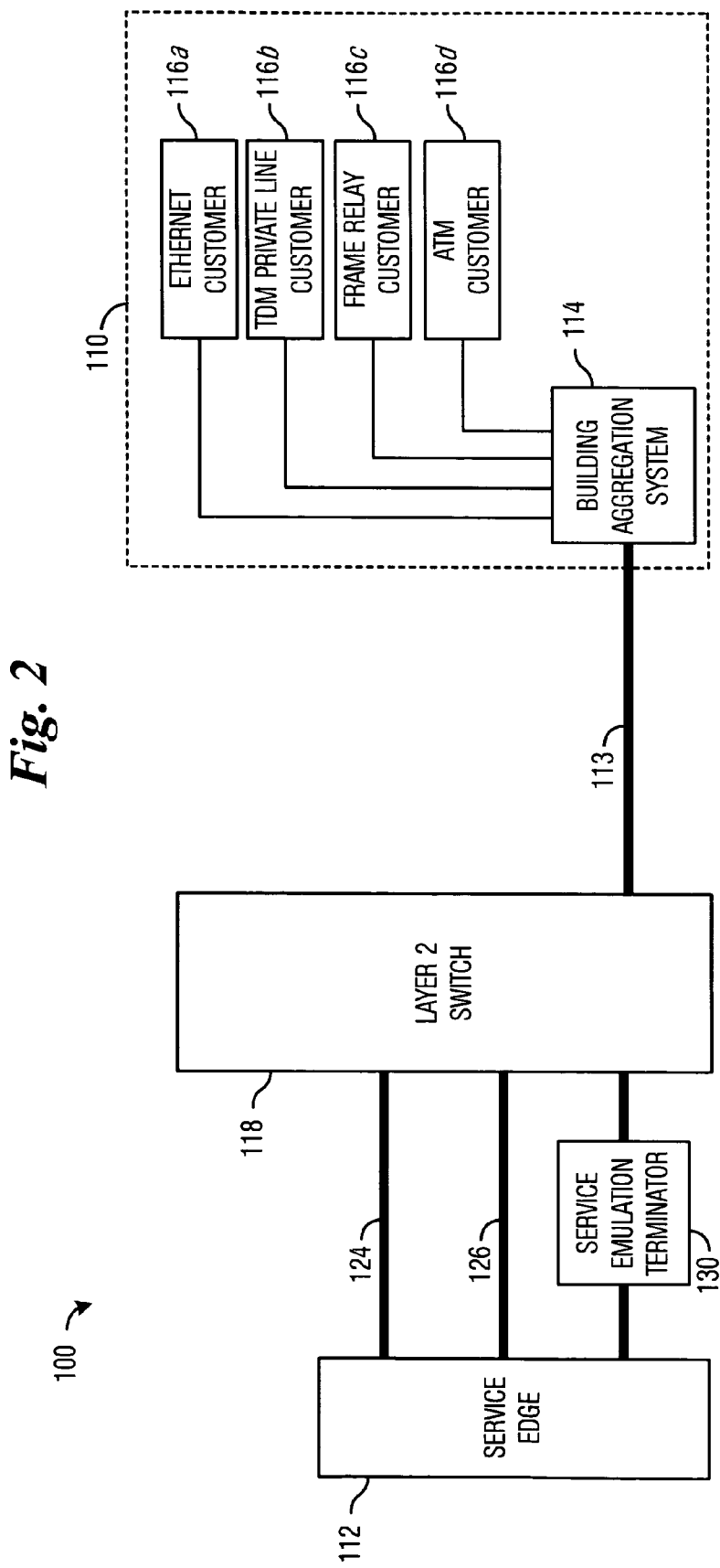
FIG. 2 illustrates an access network diagram embodying features in accordance with an exemplary embodiment of the present invention.

FIG. 2 is a network diagram in accordance with an embodiment of the present invention. FIG. 2 illustrates an access network 100 by which a customer site 110 is coupled to, and accesses the services of, a service edge 112. Customer site 110 may be, for example, an office building housing a large number of users, such as employees of one or more business enterprises. The users or businesses may subscribe to the services of a service provider who is accessible via service edge 112.

Generally, the service edge 112 represents the access point(s) to the service provider's network, which may comprise one or more core networks (not shown). A core network may comprise, for example, a system of TDM switches, such as a network of Class 3 telephone switches. A core network may also comprise an ATM and/or a frame relay network covering much the same geographical territory as the TDM network. Moreover, a network of IP routers may also be supported in a core network. While each of these networks may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native layer 2 handoff at the service edge is preferred. Service edge 112 is illustrated as a single network element for illustrative purposes only, and may actually include multiple network elements or multiple access interfaces having different capabilities.

By way of example, sources of different types of communications are depicted within customer site 110. One of the sources is Ethernet customer 116a coupled to a building aggregation system 114 over any form of connectivity amenable to Ethernet traffic, such as a 100BaseT, Gigabit Ethernet (GbE) or DSL connection. Another source of traffic may be private line customer 116b, which is coupled to the building aggregation system 114 via DS1 line. Source 116c represents frame relay customers having their frame relay traffic carried over TDM facilities such as DS1 lines to the building aggregation system 114. Asynchronous transfer mode (ATM) customer 116d represents ATM customers having their ATM cell traffic carried over TDM facilities such as DS1 lines to the building aggregation system 114. Other types of connections may be used as required to support specific customers' needs. Each of the CPE 116 may comprise one or more devices. For example, the Ethernet customer 116a typically includes a router communicatively coupled to other routers, hubs, user workstations, servers, or the like. The CPE 116a-116d are collectively referred to as CPE 116.

As noted above, customers within a building may require different types of access, or a single customer may require different types of access for different services. As will be discussed in greater detail below, the building aggregation system 114 preferably provides an interface to one or more pieces of CPE, which may be using one or more communications protocols, and aggregates the traffic into a form suitable for transmission to the service edge 112. In this manner, economies of scale may be realized by combining traffic from a plurality of less than fully utilized communications channels. A building aggregation system may serve multiple buildings within a reasonable proximity, such as a corporate, institutional campus or any other collection of sites where it is feasible.

Other components, such as demarcation devices, repeaters, amplifiers, and the like, may be communicatively coupled between the building aggregation system 114 and each CPE 116a-116d. A demarcation device, commonly used when providing Ethernet services (such as that provided to an Ethernet customer, represented by CPE 116a), is the point at which the customer connects to the resources of the access network 100. Additional repeaters (not shown) or amplifiers (not shown) may be required based upon, for example, the length of the cable runs between CPE and building aggregation system 114.

On the network side, the building aggregation system 114 is preferably communicatively coupled to one or more hubs or switches, represented by switch 118, to provide connectivity between the customer location 110 and the service edge 112. The communications link 113 between the building aggregation system 114 and the switch 118 may, for example, be a TDM communications link, such as a DS3 or SONET OC-n. In accordance with a preferred embodiment, these TDM links utilize a protocol such as X.86, GFP, PPP, or the like for accomplishing packet data transport over TDM. The communications path between the customer location 110 and the service edge 112 is illustrated as a simple two-hop connection for illustrative purposes only. The communications path between the customer location 110 and the service edge 112 may contain additional or fewer hops, and may include different paths for traffic in either direction between a service edge and a customer site. Customer location 110, through building aggregation system 114, may be coupled to service edge 112 through a network of switches and other equipment and facilities.

Additional network elements may be positioned between the building aggregation system 114 and the switch 118. For example, the building aggregation system 114 may be configured to accept a DS3 communications link as discussed above, but the communications link from the access network to the building 110 may comprise a larger communications link, such as an OC12 or OC48 optical link. In this situation, which is common in an "on-network" environment wherein the access network is owned by the service provider, an add/drop multiplexer (ADM) may be utilized to separate the DS3 traffic from and interject the DS3 traffic onto the larger OC12 or OC48 link. In an "off-network" environment, a smaller DS3 link may be leased directly from another party, such as a local telephone company or other service provider.

In accordance with a preferred embodiment, layer 2 switch 118 may provide switching and routing of traffic based upon information applied to the traffic and without having to examine the content of the customer data in the traffic. The information applied to the traffic may correspond roughly to Layer 2 or the "data link layer" of the OSI Reference Model. Layer 2 switch 118 may be coupled to a large number of customer sites 110 and building aggregation systems 114 to perform an intermediate aggregation and distribution function within the access network 100. In some instances, the layer 2 switch 118 may also be coupled directly to some or all of CPE 116.

An example of a layer 2 switch 118 suitable for use with the present invention is disclosed in U.S. patent application Ser. No. 10/858,517, and entitled "System And Method For Providing A Multiple-Protocol Crossconnect", which is incorporated herein by reference.

The building aggregation system 114 may apply information to the traffic that has significance for affecting the handling of carrier-tagged communications within the access network and may be interpreted and acted upon by layer 2 switch 118 or other elements. Building aggregation system 114 may also receive communications bearing this information and may route the communications to specific customers in response to the information.

In accordance with the present teachings, the building aggregation system 114 can be equipped to serve as one end of a plurality of carrier-tagged flows. A carrier-tagged flow represents a logical communications channel or flow established to carry carrier-tagged communications between two or more parties, or two or more points served by a communications system. The carrier-tagged communications can be voice, data, audio, video, or any other type of communications.

A carrier-tagged flow may be implemented using a service emulation instance, such as a pseudowire as described in an IETF draft document entitled "draft-ietf-pwe3-arch-06.txt." This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells.

A pseudowire is typically implemented along a tunnel implemented in a packet-switched network. Some types of tunnels that may be suitable for carrying pseudowires, or other types of communications that may be employed in conjunction with the present teachings, include Label Switched Paths (LSPs) according to the MultiProtocol Label Switching (MPLS) protocol, Layer 2 Tunneling Protocol (L2TP) tunnels, IPsec tunnels, etc.

Another example of a technique suitable for implementing a carrier-tagged flow is a logical networking tagged flow, such as virtual local-area network (VLAN) communications or the like. A technique for achieving VLAN logical subnetworking is described in IEEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an exemplary embodiment of the present teachings, a VLAN tagging approach may also be used for carrier-tagging of flows.

In accordance with the present teachings, carrier VLAN tags having significance for routing and processing in the access network may be used to encapsulate and tag customer flows. As they are encapsulated and/or tagged, customer flows may or may not already contain additional imbedded VLAN tags having significance within the customer's virtual network in accordance with typical 802.1Q usage. In accordance with the present teachings, the VLAN tagging approach may be conveniently reused for carrier-tagging purposes and may be locally significant on any port, with tag values possibly being replaced on a hop-by-hop basis.

In accordance with the present teachings, carrier tags which are applied to traffic to support handling of flows through an access network, whether in the form of tunnel labels, pseudowire labels, VLAN tags, etc., may be 'stackable' to any depth to support efficient flow management in the context of hierarchical aggregation and distribution between service edge(s) and customer locations.

In addition to supporting access communications that enable carrier tag stacking, a building aggregation system in accordance with the present teachings may serve several roles in the context of a service-agnostic access network. The building aggregation system may adapt a wide variety of customer traffic to be carried in the form of carrier-tagged flows. Where a packet switched network is used as an underlying access transport, the use of carrier-tag switching enables the efficiencies and flexibility of packetization to be realized in an access network without burdening the access network elements with the specific protocols or addressing used in the carried traffic.

To coordinate the assigning of carrier tags to traffic flows, the building aggregation system may participate in label resolution protocols with other elements and may receive provisioning instructions from remote management systems. To support the deployment of service emulation, such as pseudowire technology, in an access network to achieve service flexibility, the building aggregation system may serve as a terminal end for a large number of service emulation instances of different emulated types and may provide mapping and forwarding between customer flows and access network paths as identified by tunnel labels or service emulation instance mapping identifiers. The building aggregation system may also implement QoS functions for all types of flows, augmenting similar measures that may be performed at a service edge. Other possible roles and functions of the building aggregation system will be described below.

Building aggregation system 114 is preferably used in a carrier-tag oriented access network wherein each carrier-tagged flow is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may take the form of a pseudowire label. Carrier tags may be locally significant on any port and the tags can be swapped on a hop-by-hop basis as needed to provide a large number of flows using the finite number of identifier values that are available (approximately 1 million in the case of pseudowire labels). In this manner, switching in the access network can be simplified by encapsulating traffic in carrier-tagged flows and by interpreting and manipulating the corresponding carrier tags.

An access network in accordance with the present teachings may transparently support a mixture of flow types and customer content, including any customer-specific addressing or virtual networking fields imbedded in the customer content. The pseudowire architecture provides one example of an approach involving encapsulation and labeling of traffic that may be adapted for use as a carrier-tagged flow. It should be noted, however, that other protocols may be used, and embodiments of the present invention may be implemented with other types of protocols and physical connections.

The building aggregation system 114 couples traffic of various types, such as traffic from the CPE 116a-116d, onto the appropriate corresponding carrier-tagged flows established for reaching the service edge. Where service emulation instances are used as carrier-tagged flows, a service emulation instance terminator 130 may serve as the other end of a number of service emulation instances which have originated at one ore more building aggregation systems 114 and passed through layer 2 switches 118. The service emulation instance terminator 130 switches or routes traffic from service emulation instances to a corresponding port and/or flow communicatively coupled to the service edge 112. The building aggregation system 114, layer 2 switch 118, service emulation instance terminator 130, and communications links therebetween may coordinate to simultaneously function as any of the various data-link layer transport types that may be required by customers, including ATM, frame relay, TDM, Ethernet/IP, and the like.

Alternatively, a service edge 112 may incorporate the functions of a service emulation instance terminator 130 or may otherwise be capable of directly accepting and processing carrier-tagged flows. In this case, a service edge 112 may be coupled more or less directly to layer 2 switch 118 and the communications to and from the service edge may bear flow-identifying carrier tags in the form of pseudowire labels, tunnel labels, VLAN tags or the like. Service emulation instance terminator 130 may nevertheless be useful in situations where an existing or legacy service edge facility lacks the ability to handle carrier-tagged access communications, service emulation instances or, more specifically, pseudowires. As mentioned earlier, service edge 112 may actually represent several separate access points, perhaps to different types of core networks. Some access points within service edge 112 may be amenable to carrier-tagged flows whereas others may not be. Links 124 and 126 may represent links to TDM-capable ports on the service edge from TDM ports on layer 2 switch 118. It is also possible that, for example, one or both of these links may represent packetized data links or may represent a service edge that is able to accept carrier-tagged flows, such as carrier-tagged pseudowires, directly without requiring service emulation instance terminator 130.

A service emulation instance terminator 130 suitable for use with the present invention is disclosed in U.S. patent application Ser. No. 10/858,491, entitled "Apparatus and Method for Terminating Service Emulation Instances", which is incorporated herein by reference.

In an exemplary embodiment, Ethernet may be utilized as the layer 2 protocol over which carrier-tagged communications are transmitted. The application of Ethernet in the access network can be based on TDM encapsulation, using X.86 or GFP, e.g. Ethernet over SONET (EoS). While Ethernet is desirable because it supports variable length packets or frames, other protocols or frame formats may be used for the transport and processing of access communications.

In an implementation using service emulation instances, building aggregation system 114 may apply a unique service emulation instance mapping identifier to each of the flows from the CPE 116a-116d, and transmits the frames or packets bearing the traffic and service emulation instance mapping identifiers to the layer 2 switch 118. Similarly, the building aggregation system 114 may receive data associated with a service emulation instance identifier from the layer 2 switch 118 and converts the data to a format compatible with the corresponding CPE 116.

As another example, the building aggregation system 114 may receive Ethernet traffic from Ethernet customer 116a via the building "riser." The building aggregation system 114 receives this traffic along a port that is known to correspond to Ethernet customer 116a and maintains an association between the customer's port and Ethernet traffic stream and a corresponding carrier-tagged flow. Likewise, at the other end of the carrier-tagged flow, the service emulation instance terminator 130, the layer 2 switch, or some other network element delivers the customer's traffic to the service edge 112 and may coordinate with the service edge 112, such as by mapping of port numbers or directing of flows, to ensure that the network identifies the customer's traffic as such and appropriately handles the traffic.

In accordance with a preferred embodiment of the present invention, when a device on a customer LAN addresses Ethernet frames to the service edge, the destination MAC address field in the Ethernet frames will correspond to that of the service edge itself or some other remote device port rather than being associated with any of the access network elements. CPE may be provisioned to resolve the address of the service edge such that communications intended to be sent to the service edge will arrive at a port of the building aggregation system. The building aggregation system does not need to act as a layer 2 termination point as it appears to the CPE, so no MAC learning behavior or other typical LAN bridge behavior is required of the building aggregation system.

To establish or modify a customer's carrier-tagged flow between the CPE 116 and the service edge 112, the customer may indicate to the network service provider the desire to establish communications in a particular manner. This request may be submitted either manually or automatically through a user network interface (UNI). As will be described in greater detail below, the establishment of communications through the access network shown may originate in a variety of ways. To coordinate fulfillment of an access communications request, a network management system, provisioning function, or the like, may dispatch provisioning and configuration instructions to the building aggregation system 114, the layer 2 switch 118, the service emulation instance terminator 130, or other network elements. To varying degrees, these elements may perform some functions autonomously or may coordinate with one another to fulfill service requests.

For convenience, the operation of exemplary embodiments of the present invention discussed herein are often described in terms of traffic flowing from the CPE 116 to the service edge 112. However, it should be noted that the same techniques discussed herein also apply to traffic leaving the service edge and being distributed to an appropriate customer endpoint. Every element may serve a complementary role related to the direction of flow. It is also worth mentioning that some traffic through an access network may be from one customer location to another in a given vicinity and may not necessarily be destined for a service edge. Many of the techniques described for traffic between a customer location and a service edge would be applicable to this situation as well.

With respect to communications link 113 as shown in FIG. 2 and elsewhere, a service provider may have many options. Aside from the core network service provider installing and operating their own access links, there are many favorable leasing arrangements available as alternatives to leasing from an incumbent LEC. Competitive access providers offer new cost points to reduce access costs. Dark fiber leases from municipalities, utilities, private companies, and CLECs offer cost effective fiber solutions. Any or all of these avenues may be considered when designing a cost effective, scalable access solution. It is also desirable for a service provider to accommodate a wide variety of alternative access architectures. Technologies like xDSL, MMDS, mobile wireless, cable, DWDM, data rings and optical rings all give rise to new possibilities and new complexities.

While these factors are encouraging for a service provider, it is still the case that, particularly if TDM links are used, provisioning a customer's access link(s) involves a great deal of manual cable patching at various sites and grooming of traffic using expensive multiplexors and crossconnect equipment. These manual processes involving several physical locations results in delays and the costs of manpower and equipment. In a typical scenario, it is not unusual for a path between a customer site and a service edge to comprise more than 20 "touchpoints", that is, places where a cable must be manually plugged in or equipment must be manually configured in some way.

The present teachings emphasize the possibility that significant advantages, such as the elimination of such touchpoints, may be realized in the access network if traffic is packetized and tagged rather than handled as TDM streams. This allows elements in the access network to route communications using very simple techniques based solely on the outermost tags on data-carrying frames. This simplicity contributes to making access network elements highly flexible and scalable.

An unusual aspect of this type of an access arrangement is that it may even be more efficient to carry native TDM traffic over a packetized access link than over a TDM circuit. As will be described below, packetized access transport of TDM traffic is actually preferable to TDM transport of the traffic even under the circumstances that, at the service edge, the TDM traffic will be handed off to a TDM-oriented or circuit-switched core transport network.

Figure 3:
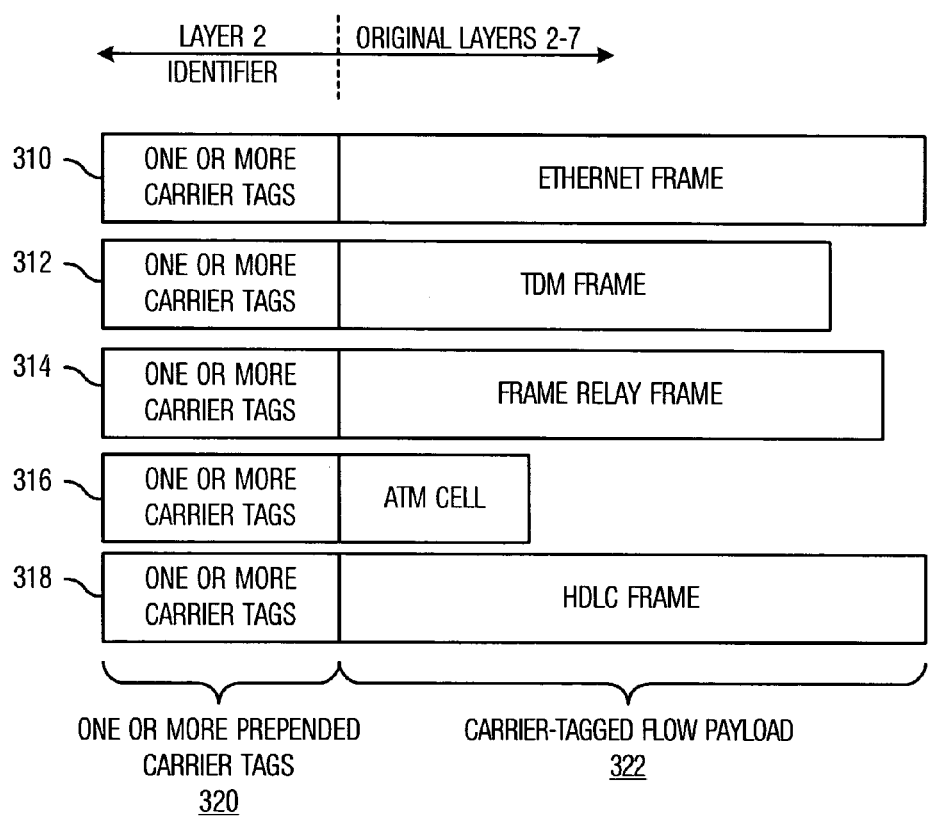
FIG. 3 illustrates a variety of frame formats for carrying access communications as a carrier-tagged flow in accordance with an exemplary embodiment of the present invention.

FIG. 3 illustrates examples of data messages or frames that may be transmitted into the access network, or received from the access network, by the building aggregation system 114 in accordance with an exemplary embodiment of the present invention. (More detailed formats of exemplary messages or frames are also shown and described later in conjunction with FIGS. 12-15.) Each of messages 310-318 have two portions: a carrier-tagged flow payload 322 and one or more prepended carrier tags 320. The carrier-tagged flow payload 322 represents, for example, the information as it is received from customer premise equipment at the customer site. The different types of messages shown correspond to various formats associated with a particular CPE interface, such as an Ethernet frame message 310, a TDM frame message 312, a frame relay frame message 314, an ATM cell message 316, or the like. Other messages, such as a high-level data link control (HDLC) frame 318, an ATM application adaptation layer 5 (AAL5) protocol data unit (PDU), storage area networking protocol frames or the like, may also be represented and processed in a similar manner. In general, the messages will usually carry various types of customer data corresponding to layers 2-7 of the OSI Reference Model.

As FIG. 3 shows, each message type may be tagged and processed in a uniform manner by the addition of one or more carrier tags. FIG. 3 reflects the format of composite messages that are sent between a building aggregation system 114, a service edge 112 and any other intervening elements. As illustrated in FIG. 3, the carrier-tagged flow payload 322 is kept substantially intact and a carrier tag 320 is prepended to the carrier-tagged flow payload 322 to prepare it for transmission through the access network. Depending on implementation, the carrier tag 320 may comprise, for example, a pseudowire label, a VLAN identifier, a tunnel label or the like. Multiple carrier tags may be stacked within a message or frame to provide for a hierarchical aggregation and routing mechanism to be implemented in the access network.

In accordance with a preferred embodiment, the building aggregator system 114, at a customer-side port, for example, performs this carrier tagging of traffic that is received from CPE and is bound for the service edge. Likewise, building aggregator system 114 will preferably receive from the service edge messages having such carrier tags and will remove the carrier tags and distribute the messages to the appropriate CPE-side link.

It is particularly noteworthy in FIG. 3 that, regardless of message type, all of the carrier tags 320 are of uniform format. (In the case of tunnel labels, for example, messages of different types may even have the same tag value if they happen to be routed commonly.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 320 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 3, with little or no changes being required in the design and operation of the layer 2 switches 118 or other elements.

In some implementations, it may be desirable to prepend one or more tunnel labels (not shown) to the messages 310-318. This may be in addition to any pseudowire labels or other carrier tags already applied. A tunnel label allows a tunnel to be established throughout the access network, such as between a building aggregator and a service edge, improving scalability in the network. This mechanism may be particularly useful when many flows are to be routed to the same destination or service edge. By assigning the flows to a common tunnel, network elements, such as the layer 2 switch 118, may collectively route the service emulation instances within the tunnel by evaluating the tunnel label. In an exemplary embodiment, the tunnel label is an LSP label prepended to the messages 310-318. In accordance with the present teachings, tunnel labels may also be stacked to any degree needed to support a tunneling hierarchy, which may further facilitate efficient and scalable management of large numbers of flows.

Although the carrier-tagged flow payload 322 is shown and described as being kept essentially intact, it may be desirable in some situations to modify this original message. For example, the original message portion 322 of the Ethernet frame message 310 and the frame relay frame 314 frequently includes a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network. Another scenario involving slight modifications of payload are described below in conjunction with block 812 of FIG. 8.

Figure 4:
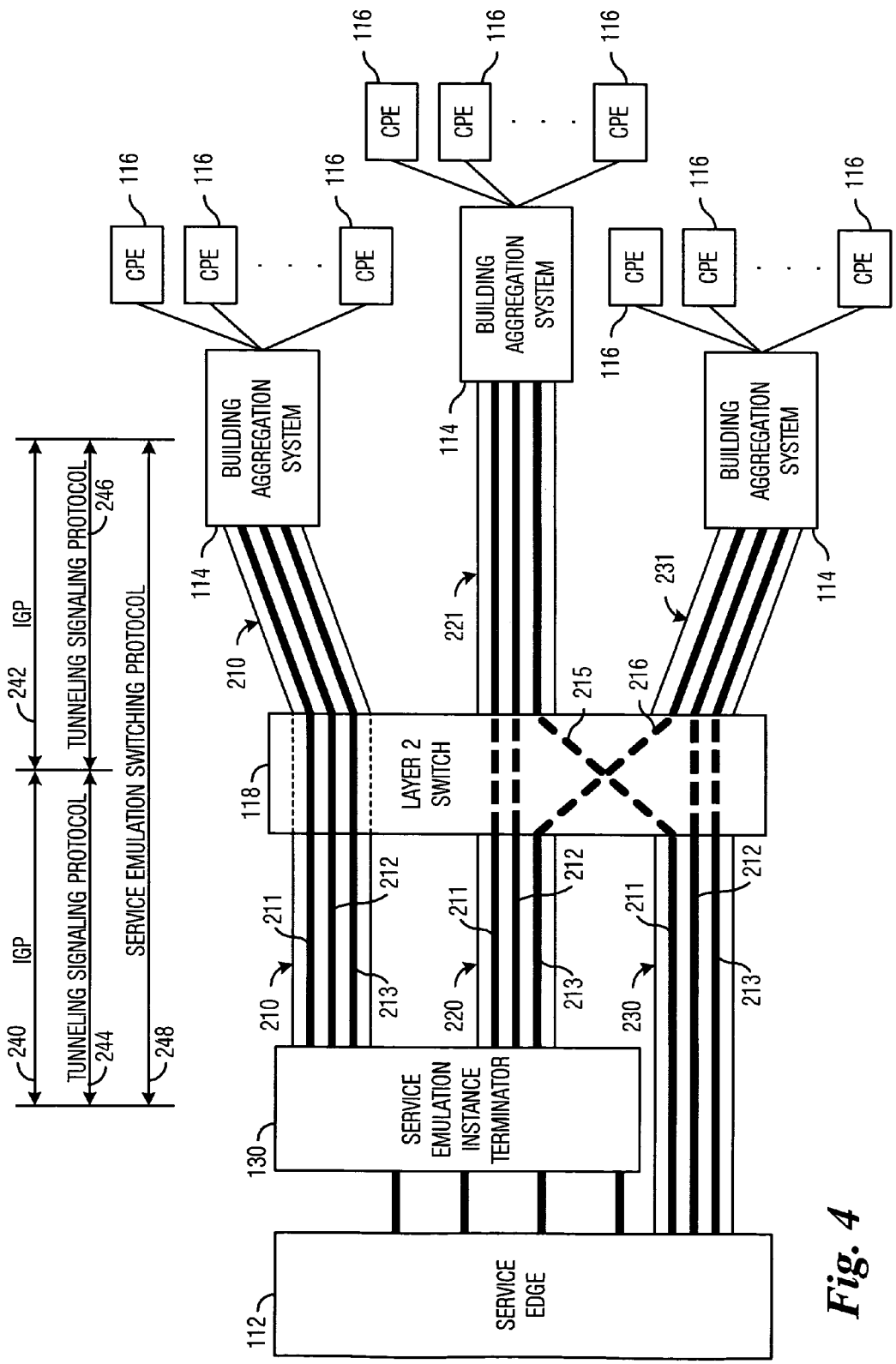
FIG. 4 illustrates an access network diagram depicting several carrier-tagged flows traversing an access network in accordance with an exemplary embodiment of the present invention.

FIG. 4 is a logical view of example carrier-tagged flows through an access network in accordance with an embodiment of the present invention. Customer sites (represented by CPE 116 coupled through building aggregation systems 114) are shown to be coupled, through various access network resources, to the edge of a service provider's network represented by the service edge 112, and optionally involving service emulation instance terminator 130. The layer 2 switch 118 is shown as an intermediary and may participate in grooming, aggregating and directing communications traffic in the access network, as well as performing crossover switching between TDM ports and packet-oriented ports. For clarity, FIG. 4 illustrates two-hop paths, although it is possible that there are some intervening transmission elements or other layer 2 switches 118 along the access coupling.

In FIG. 4, tunnels in the form of label switched paths (LSPs) 210, 220, 221, 230, and 231 are shown to have been established between various building aggregation systems 114 and the service edge 112 (optionally through terminator 130). Each LSP corresponds to a pathway or a tunnel for carrying traffic from the building aggregation system 114 to the service edge 112, or vice versa. It should be noted that FIG. 4 is provided as a logical view and that various physical implementations may be used. For example, each of the label switched paths 210, 220, 221, 230 and 231 may be transported, routed or switched over different physical links or the same physical link.

Each LSP is shown to be carrying a respective set of carrier-tagged flows 211, 212, and 213. In some implementations, such as when service emulation instances are used, each carrier-tagged flow may emulate a specific type of service, such as an ATM, frame relay, ethernet or TDM/SONET service. Regardless of emulated service type, the traffic belonging to these carrier-tagged flows is made to travel along an LSP or tunnel based upon a carrier tag applied to the traffic and a mutual understanding among the network elements as to how to handle traffic having a specific tag value.

Where service emulation instances are used to implement carrier-tagged paths, the traffic may be identified and routed through the access network based on a service emulation instance mapping identifier which serves as the carrier tag (or as one part of a composite carrier tag.) More specifically, where pseudowires are used as service emulation instances, a pseudowire label in each traffic packet or frame may serve as a carrier tag component.

In an implementation wherein logical networking tagged flows are used, an outer VLAN tag may serve as the carrier tag, or a portion thereof. A tunnel label, such as an LSP label, may also be applied to the traffic and may be used, solely or in conjunction with other fields, as the label upon which the traffic is routed through access network elements. In accordance with a preferred embodiment, any of these possible carrier tags may be present multiple times or may be stacked in any combination with one another within the traffic packets or frames. This may be done to support various flow management arrangements that involve nesting of tunnels or flows or otherwise implementing stages of aggregation in the access network.

Examples of how nested tunnels or paths may be accomplished and managed are disclosed in U.S. patent application Ser. No. 10/858,525, entitled System And Method For Managing Communications In An Access Network, which is incorporated by reference herein.

Each carrier-tagged flow 211, 212, 213 may carry multiple customer-specified "subflows" in a manner that is transparent to the access network. That is, the customer traffic may optionally contain additional imbedded VLAN tags having significance within the customer's virtual private network in accordance with typical 802.1Q usage. Any VLAN tags or layer 2 VPN addressing fields that are present within the customer traffic may be encapsulated using carrier VLAN tags having significance for routing and processing in the access network. Consequently, a traffic frame or packet in accordance with the present teachings may comprise some VLAN tag fields that are controlled by a customer, or have significance within the customer's private network, in addition to VLAN tags that serve as carrier tags having significance to the access network. Compared to any customer-imposed VLAN tags appearing in the traffic, the carrier VLAN tags may be derived from the operation of entirely different protocols among different elements than the customer tags. Likewise, where other forms of carrier tags are employed, such as pseudowire labels, the carrier tags may resemble customer labels or tags appearing in customer traffic, but will have different significance and may be derived from different protocols than the customer information. In accordance with the present teachings, the access network may be primarily concerned with the outermost labels or carrier tags that have been applied to the traffic for access network purposes, such as tunnel labels or service emulation instance mapping identifiers applied to the traffic. In accordance with the present teachings, a VLAN tag format may be applied for carrier-tagging purposes and may be locally significant on any port, with tag values possibly being replaced on a hop-by-hop basis.

Label switched path 210 represents an exemplary embodiment in which the carrier-tagged flows are routed through layer 2 switch 118 on the basis of a tunnel label. In other words, each unit of traffic is tagged with a tunnel label and access network elements use the tunnel label to determine how to process and where to send the traffic. In this situation, a tunnel may be established from building aggregation system 114 straight through to service emulation instance terminator 130. Each flow within the tunnel identified by the tunnel label, e.g., label switched path 210, is routed or switched in the same manner, as illustrated by the dotted label switched path line and the solid-lined flows passing through the layer 2 switch 118. With this approach, layer 2 switch 118 may efficiently switch traffic among its ports by observing and acting solely or primarily upon this tunnel label present in the traffic. Layer 2 switch 118 may not have to read and act upon a service emulation identifier, such as a pseudowire label, in order to properly route traffic of this nature.

In an alternative embodiment, the carrier-tagged flows 211, 212, 213 may be service emulation instances and each service emulation instance may be routed or switched based upon a service emulation instance mapping identifier. For example, the label switched paths 221 and 231 are shown to be established between the various building aggregation systems 114 and layer 2 switch 118. Other LSPs 220 and 230 are separately established between the layer 2 switch 118 and the service edge 112. This provides the option of switching individual flows within layer 2 switch 118. Switching within layer 2 switch 118 may be based upon a service emulation instance mapping identifier present in the traffic.

As in this example, where tunnels directly connect network elements without passing through other switching or terminating elements, tunnel labels may be optional due to the point-to-point nature of the communication. Nevertheless, a tunnel label field may be included to convey useful information, possibly aside from tunnel identification.

To illustrate flow switching within layer 2 switch 118, certain of the flows 211, 212, and 213 are illustrated as remaining together within each of the labeled switched paths. Upon reaching a switching point, such as layer 2 switch 118, at the terminus of a tunnel, such as label switched path (LSP) 221, each flow through the access network may be switched independently based upon, among other things, the type of service being provided, the requested service edge, one or more aspects of the traffic, and the like. As indicated by the dotted lines 215 and 216, each of the carrier-tagged flows within label switched paths 220, 221, 230, and 231 may be routed or switched independently of each other as they pass through layer 2 switch 118, the identification and switching of each flow being based upon a flow identifier such as a pseudowire label. In contrast, the flows within LSP 210 are not switched at layer 2 switch 118 because the tunnel extends between building aggregation system 114 and service emulation instance 130 and, consequently, layer 2 switch 118 only observes and acts upon the tunnel label. Usually, a tunnel such as LSP 210 would have been established to expressly avoid switching of individual flows through layer 2 switch 118. In practice, either approach, i.e. "tunneling to" or "tunneling through" layer 2 switch 118, may be desirable under various circumstances.

As depicted by reference numeral 248, a label selection or service emulation switching protocol, such as the Label Distribution Protocol (LDP), may be exercised among the endpoints of a tunnel, a carrier-tagged path, a service emulation instance, a pseudowire, or the like in order to assure agreement among network elements on how traffic will be identified within the tunnel or path. In many cases, these endpoints may be the building aggregation system 114 and the service edge 112 or service emulation instance terminator 130.

Reference numerals 240 and 242 represent how routes are chosen between the building aggregation system 114 and the layer 2 switch 118 and between the layer 2 switch 118 and the service emulation instance terminator 130 or service edge 112. Identifying and selecting the appropriate paths through the access network may be accomplished using an interior gateway protocol (IGP) such as the Open Shortest Path First-Traffic Engineered (OSPF-TE) approach as described in Internet Engineering Task Force's (IETF's) Request For Comments (RFCs) 2328, 2676, et al., which are incorporated herein by reference. Other routing protocols are known and may be used.

Reference numerals 244 and 246 indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow and its performance requirements. Alternatively, it is possible to establish static LSPs wherein little or no signaling is required.

Multiprotocol label switching (MPLS) is described in documents IETF's RFCs 3031, 2702, et al. maintained by the Internet Engineering Task Force (IETF), which are incorporated herein by reference. Related to the negotiation of labels that are used in MPLS, the label distribution protocol (LDP) is described in IETF's RFC 3036, which is also incorporated herein by reference. The label distribution protocol is also discussed in IETF's Draft entitled "draft-ietf-pwe3-control-protocol-06.txt." The use of RSVP, MPLS and LDP are shown by way of example only and should not be construed as limiting the ways in which the present invention may be implemented.

The directionality of the traffic may have implications for the establishment of tunnels, service emulation instances, pseudowires, logical networking tagged paths, etc. For example, where an RSVP/LDP mechanism is used to establish label switched paths, a bi-directional link may require initiating the formation of a tunnel in one direction, originating at the building aggregation system 114, and forming the corresponding tunnel in the reverse direction by originating an RSVP request from the service emulation instance terminator 130. These tunnels will be independently formed, may have different QoS requirements, and may take different routes between the building aggregation system 114 and the service emulation instance terminator 130.

In accordance with the present teachings, a packetized transport that is used to carry customer flows may employ data frames or packets of a type that allows for each frame or packet to vary in length. This is in contrast to ATM, for example, wherein he fixed cell size of 53 bytes is used. The use of a packetized transport that supports variable length packets enables simplified encapsulation of customer traffic, which in turn provides advantages in simplicity and scalability of the access network in accordance with present teachings. In particular, the use of variable length packets allows for nesting of encapsulations and stacking of carrier assigned tags to any degree necessary in support of efficient aggregation and scalable management of a large number of flows in the access network. The ability to perform nesting of tunneling and/or encapsulations has important implications for the management of signaling sessions which must be sustained by the service providers equipment and hence affects scalability of a commercial network.

Figure 5:
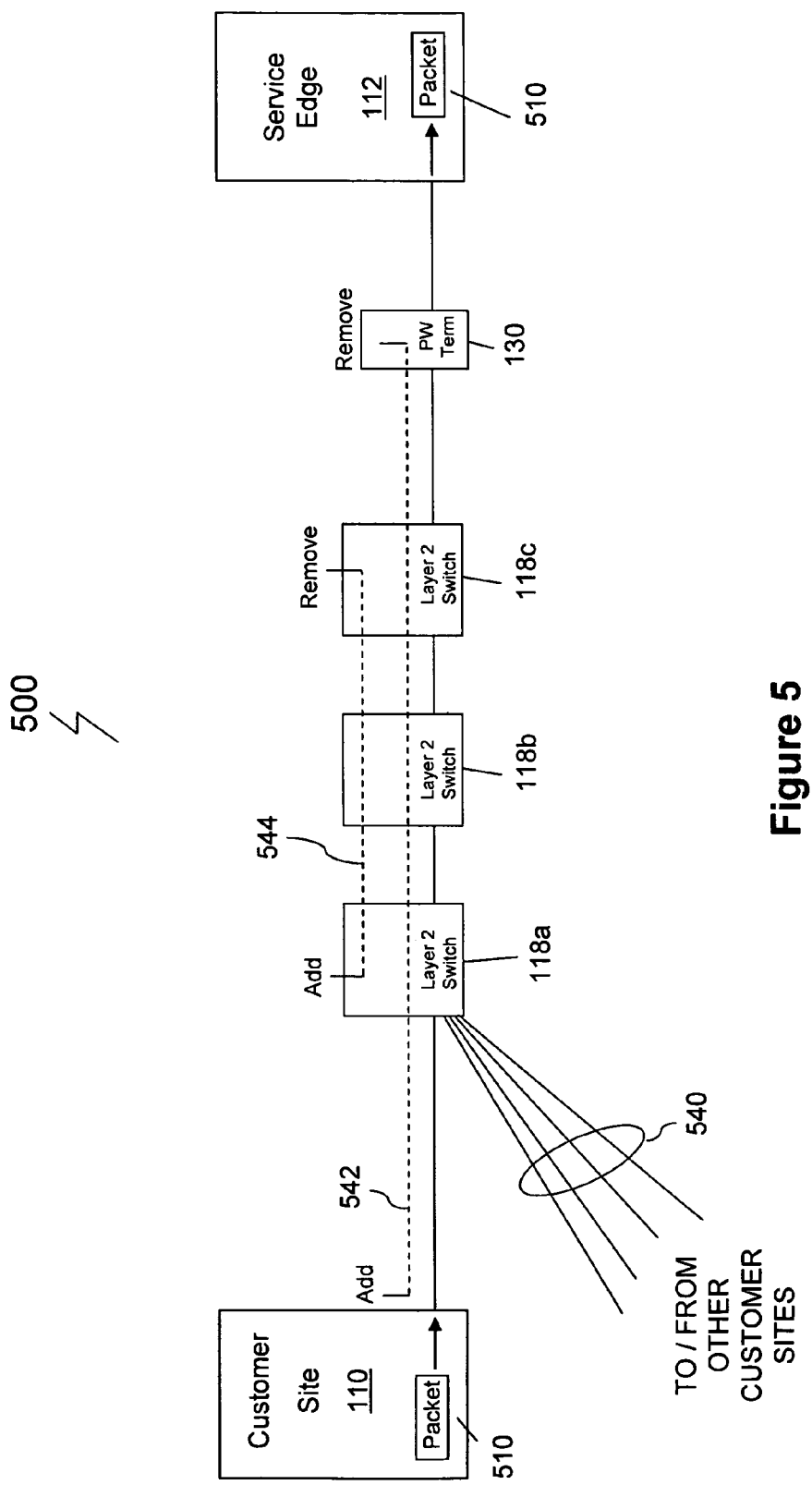
FIG. 5 illustrates an access network depicting the operation of nested tunnels in accordance with an exemplary embodiment of the present invention.

FIG. 5 is a diagram of access network elements and illustrates a simple example of how stackable carrier tags may be applied to the handling of traffic flows in an access network in accordance with an exemplary embodiment of the present invention. For clarity, many of the drawings shown thus far have depicted simple linear, two-hop paths. However, as mentioned before, an access network may actually comprise an interconnected arrangement of various intermediate aggregators and switches, such as a mesh of layer 2 (L2) switches 118. These may provide access aggregation and switching which couples a number of customer buildings 110 to one or more service edges 112. Such an arrangement may also provide for switching of flows among sites in a region without necessarily going through a service edge. This may be appropriate for certain types of flows, such as private line services and storage area networking (SAN) communications.

While it is possible to establish a tunnel, such as a label switched path, through the access network for each individual flow (or a group of flows like pseudowires within a LSP) between CPE and a particular service edge, doing so can become burdensome to the network elements. The burden relates to management of flows rather than the overall bandwidth of the traffic. As described in FIG. 4, a number of signaling protocols (see 240 through 248) may be operable to coordinate the establishment of paths among cooperating access network elements, such as L2 switch 118, building aggregation system 114 and service emulation instance terminator 130. Some of the signaling protocols may involve a persistent session between the network elements and some maintaining of state information by processes operating in the network elements. Consequently, each flow that is established and maintained by such signaling imposes a burden to the processing capabilities and other resources of the network elements. This is particularly true of service edge components where hundreds of thousands of flows may converge in highly aggregated form. It is desirable to minimize the number of independent flows, or more specifically flow-related signaling sessions, that a network element must separately manage.

In FIG. 5, an example packet 510 is depicted as originating at customer site 110 and being carried through an access network to ultimately reach service edge 112. Initially, as the packet is received and processed by a building aggregation system (not shown) serving customer site 110, the packet may receive a first carrier tag corresponding to a tunnel 542 which is known to lead traffic to the appropriate service edge 112. (For clarity in the following description, each layer 2 switch 118a-118c will simply be referred to as a 'switch.').

As the packet, now including the appended first carrier tag, reaches switch 118a as part of its traversal of tunnel 542, L2 switch 118a may recognize the value of the first carrier tag and determine that the packet belongs to one of a number of flows which are all destined for another particular switch 118c. It is likely that a large number of other access tunnels flows 540 involving switch 118a may be destined for service edge 112 by way of switch 118c and perhaps service emulation instance terminator 130. Accordingly, a tunnel 544 may be established from switch 118a, through switch 118b, to switch 118c. Tunnel 544 may correspond to a second carrier tag value.

In passing from switch 118a to switch 118c, tunnel 542 may be 'nested' within tunnel 544. While traversing this portion of the access network, packet 510, already within tunnel 542 and having the first carrier tag, then experiences a stacking of carrier tags by the addition of the second carrier tag. In accordance with a preferred embodiment of present invention, the second carrier tag value corresponding to tunnel 544 becomes the outermost tag value and is used as part of an encapsulation of packet 510, including the first carrier tag value as well as the remainder of the packet 510 as it was submitted to the access network by the customer premise equipment. Referring briefly to FIG. 3, this action corresponds to the appending of additional carrier tags 420 extending leftward in front of each native protocol frame or carrier-tagged flow payload 422.

This relieves switch 118b of having to deal with a large number of signaling sessions corresponding to each tunnel 540 or individual flows carried therein. Switch 118b may simply read and act upon the outermost carrier tag on each inbound packet or frame, namely the second carrier tag value imposed by switch 118a, in order to properly forward the packet to switch 118c. Switch 118b need not be concerned with other carrier tag values, pseudowire labels, or the like that are present in the packet corresponding to path 540 or individual flows therein.

At first, the scenario of FIG. 5 may seem to be a trivial example wherein a linear path from customer site 110 to service edge 112 is inevitable. The real value of this approach becomes apparent when considering the number of customer sites 110 and flows emanating from those sites which are likely to traverse common portions of the access network to reach one or more service edges. It is also important to consider that the switches 118a-c may be part of a mesh network through which many possible alternative paths may be implemented.

FIG. 5 illustrates the general concept of stacking of carrier tags by way of example. It should be clearly understood, however, that a variety of possible approaches for employing the stackability of carrier tags may be employed depending on particular circumstances and design goals. Stacking of carrier tags may be performed for other purposes aside from nesting of tunnels, paths or circuits. The cooperative use of carrier-tag stacking may occur among different groups of network elements. A mixture of approaches involving stacked carrier tags may be employed in an access network if properly managed. With respect to other carrier tags in a stacked arrangement, each carrier tag may have different significance for access network switching, may be visible to or significant to different network elements and may be derived from the operation of different protocols or instances thereof.

Different schema for employing stackable carrier tags may be readily implemented merely by altering the switching tables and table-driven tag manipulating behaviors among the network elements. This provides exceptional flexibility even at the level of the operating logic used in the access network without having to alter the fundamental design or processing of the network elements.

Techniques for advantageously employing and managing stackable carrier tagged flows are disclosed in U.S. patent application Ser. No. 10/858,525 entitled "System And Method For Managing Communications In An Access Network," which is hereby incorporated by reference in its entirety. However, the use of carrier tags which are stackable to any degree needed as taught herein also allows alternative or complementary approaches to be readily implemented. Prior art approaches, such as ATM and frame relay access circuits, do not provide for multiple carrier tag values to be stacked to identify a flow and were not designed in recognition that, for example, it may be desirable to perform nesting of tunnels or the like to achieve efficiencies in an access network. Stackable carrier tags may be employed for implementing a tunnel nesting hierarchy even in the sense of having access network tunnels being nested into core network tunnels for delivery to distant metro hubs.

The ability to stack any number of carrier tags in a given packet in a carrier-tagged flow, in accordance with the present teachings, stands in contrast to prior art packet switching techniques such as ATM, Frame Relay, Switched Multi-Megabit Data Services (SMDS), etc. For example, the standard fixed cell size for ATM is 53 bytes (octets). This fixed cell comprises 5 bytes of overhead for activities such as addressing, cell loss priority (CLP), header error control, and 48 bytes of payload. There is no provision in ATM to stack an arbitrary number of labels to facilitate addressing and routing within a network. Therefore, the use of fixed length ATM cells as a foundation for carrying traffic conforming to a variety of other protocols would not provide many of the advantages of the label stacking method of the present teaching. In Frame Relay, although the length of the cell or frame size may vary, there is also no provision in the FR protocol to stack an arbitrary number of labels (DLCIs) to facilitate addressing and routing within a network. In accordance with the present teachings, the system and method for using carrier-tagged flows in a communications access network described herein provides significant advantages over existing packet switching techniques.

Figure 6:
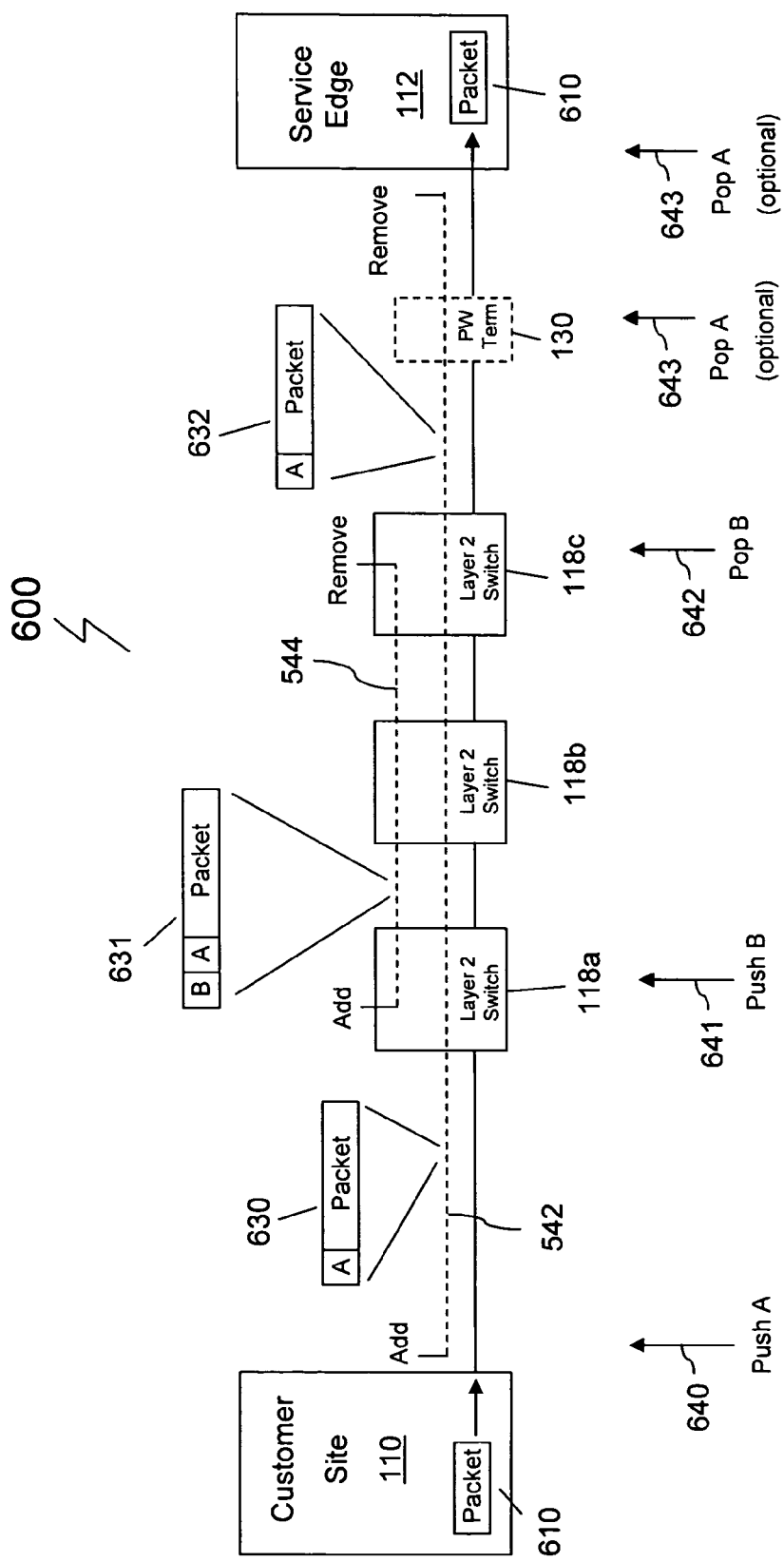
FIG. 6 illustrates an access network depicting a stacking of carrier tags in conjunction with nesting of tunnels in accordance with an exemplary embodiment of the present invention.

FIG. 6 is a diagram of access network elements further illustrating a nesting of tunnels and a corresponding stacking of carrier tags in accordance with an exemplary embodiment of the present invention. In particular, FIG. 6 emphasizes the manipulations of the carrier tag "stack" and the appearance of the packet as it traverses the access network to reach service edge 112.

The carrier tags being stacked may be tunnel labels in the example of FIG. 6, but in practice may include any or all of the carrier tag types described herein, including such components as service simulation instance mapping identifiers, pseudowire labels, VLAN tags, etc. or any combination thereof.

As packet 610 coming from customer site 110 is processed by a building aggregation system or the like, a 'push' operation 640 is performed to append a first carrier tag to the packet. As the packet is transported to L2 switch 118a, it adopts the form of a carrier-tagged frame 630 comprising the first carrier tag (labeled 'A') along with the packet payload (which may also be referred to as a 'carrier-tagged flow payload' because it is the payload with respect to a carrier-tagged flow.) Push operation 640 may be provisioned as a flow processing behavior encoded in a forwarding table in a building aggregation system component as described earlier. When carrier-tagged frame 630 arrives at L2 switch 118a, the contents of another forwarding table therein may indicate that a second push operation 641 is to be applied the packet, causing a second carrier (labeled 'B') to be added to the packet, resulting in doubly carrier-tagged frame 631. The forwarding table may also indicate that the packet is to be sent along a connection that leads to L2 switch 118b. L2 switch 118b, upon observing the outermost carrier tag value (labeled 'B'), simply routes the frame onward to L2 switch 118c. At L2 switch 118c, its forwarding table may instruct that the second carrier tag is to be removed, which corresponds to 'pop' operation 642. At this point, it is possible for the value of the second carrier tag to indicate to L2 switch 118c that the resulting carrier-tagged frame 632 (which now only has the first carrier tag appended) is to now be passed along to service edge 112 or, optionally, a service emulation instance terminator 130. Alternatively, having removed the second carrier tag, L2 switch 118c may then read and interpret the remaining first carrier tag value in order to determine that the frame is to be sent to the service edge in accordance with the defined end points of tunnel 542.

The packet 610 may reach the service edge in the form that it was initially submitted at customer site 110, that is, devoid of any carrier tags. The final pop action 643 to remove the first carrier tag may optionally be performed at different points, or not at all. Depending on the approach taken, L2 switch 118c may remove both the first and second carrier tags if it is the terminal end of both of the corresponding tunnels 542 and 544, or is a penultimate node before handing the packet off to the ultimate destination, service edge 112. Alternatively, service edge 112 may receive the carrier-tagged frame 632 bearing one or more carrier tags and the service edge 112 may be configured to remove or otherwise process the carrier tags. As another alternative, an optional service emulation instance terminator (not shown) may be employed to receive and process any traffic having carrier tags and to provide the traffic to the service edge 112 in whatever form it requires. Accordingly, a service emulation instance identifier may serve as the endpoint of tunnels or of any form of carrier-tagged flows and may engage in signaling to fulfill this role.

While the examples of FIGS. 5 and 6 describe a carrier tagging scenario wherein traffic proceeds from customer site 110 to service edge 112, one of skill in the art may also appreciate that similar or complementary carrier tagging processes may be applicable for traffic traveling in the opposite direction.

In accordance with the present teachings, a packetized transport is to be used for any and all types of access services needed by customer locations, including ATM, FR, TDM, private line, etc. Some flows, such as voice-over-IP, voice-over-ATM or other streaming audiovisual media, will require certain quality of service performance on the part of the access network. Flows that have traditionally been carried via ATM, for example, may have relied upon certain transmission attributes such as consistent delay characteristics.

To ensure that access bandwidth in the form of a large packet communications pipe is shared fairly among the many flows that it carries, certain measures are implemented in accordance with the present invention to ensure that flows that require certain quality-of-service (QoS) parameters may be adequately handled even as other traffic flows of all types dramatically change the overall burden upon the access network or particular access link.

For reasons described above, a packetized transport, such as Ethernet, may be usefully employed as a foundation transport in implementing an access network, with all other forms of customer traffic flow being encapsulated and carried thereon. However, Ethernet, and certain other types of protocols, lack some quality of service provisions that are inherent in other protocols, such as ATM. Unlike ATM, Ethernet was developed primarily for typical "file transfer" types of data communications and without any particular consideration for supporting real-time communications.

ATM cells include a header bit that indicates whether a given cell is "discard eligible". This is used for designating cells which exceed a given guaranteed data rate. Although, these cells are not discarded at a point of ingress into the network, they are designated as being discardable so that downstream elements may discard these packets if the network is congested and an element becomes overburdened. The use of discard eligibility indicator ensures that the network "tries its best" to carry flows in excess of their guaranteed data rates and also ensures fairness in that an overburdened switching element will not indiscriminately discard a large proportion of the cells in the subject flow which would cause it to experience less than its guaranteed bandwidth.

In accordance with the present teachings, all customer flows, regardless of native format, may be provided with a similar bit or field which indicates discard eligibility. The value of this bit or field may be set at a customer-side port of a building aggregation system 114. Effectively this aspect of the present teachings enables a consistent quality of-service approach to be implemented across all customer flows, lending bandwidth provisionability even to flows of protocols that never traditionally had such provision. This also ensures the integrity of access network operation through the various stages of aggregation towards the service edge.

Another quality-of-service/class-of-service measure that is enabled in accordance with the present teachings relates to the relative prioritization of traffic and the differentiation of per-hop behaviors as the traffic traverses switching and terminating elements. A traffic stream marked as high priority, such as a delay-sensitive voice signal, may receive preferential treatment in comparison to other flows as it undergoes queueing and forwarding in network elements, such as a series of layer 2 switches 118.

A traffic-bearing data frame may be marked with an indicator, which may be generally referred to as a handling classification value (HCV). A handling classification value may be included as part of a carrier tag, such as in a designated handling classification field in the carrier tag structure. Alternatively, a handling classification value may be encoded in the values of other fields, such as a carrier tag value. A handling classification value carried with a traffic-bearing data frame may indicate to network elements how the data frame is to be handled within each network element. Depending on a handling classification value presented in a data frame, a network element, such as a layer 2 switch 118, may preferentially expedite the data frame through the element or perform other actions which differentiate the handling of traffic.

For example, the data frame having a particular HCV may be selectively placed into a special queue which is given priority handling by a scheduler function in a layer 2 switching element.

In accordance with an exemplary embodiment of the present teachings, a service emulation instance mapping identifier, such as a pseudowire label, comprises bits or fields in the label data structure which may be used to indicate a handling classification value. For example, a pseudowire label may be used which has three experimental bits, or 'EXP' bits, which are not otherwise designated for a specific purpose. These bits may be used to indicate a handling classification value as described above.

By using the pseudowire 'EXP' bits in this manner, a service provider or network operator may provide quality of service on aggregate LSPs and may also provide granular QoS on a per-pseudowire or per-virtual-circuit basis. It is likely that, in an access network embodying the present teachings, many flows traversing a common tunnel will have various levels of QoS requirements, depending on the type of pseudowire and the associated QoS requirements. Consequently, it is beneficial to have a mechanism to differentiate the QoS and forwarding behavior required on a hop-by-hop or path basis. In particular, path-wise QoS may be very useful in some cases. Layer 2 priority/PHB values in an encapsulated payload can be mapped into the pseudowire EXP bits. In intermediate label-switched routers, these bits may or may not be examined. However, at egress, these values may be used to assist in queuing and forwarding decisions. Further, where penultimate hop popping techniques are employed, the LSP EXP bits are often discarded with the popped label. Placing the QoS information in the EXP bits of the pseudowire label allows the end-to-end QoS to be retained, for example, as the pseudowire may be provided to a service edge or service emulation instance terminator. QoS indications can be used by, or passed through, a service edge or a core network.

Accordingly, a handling classification value may be indicated in a carrier tag, such as a tunnel label, to affect handling of an access traffic flow by access network elements and an equal or analogous value may also be replicated in a pseudowire label which is also carried in the same data frame. At any point in the originating, transporting, switching and terminating of a carrier-tagged communication as taught herein, the values of the handling classification fields (HCF) in multiple respective carrier tags may be set to equal values or set to reflect consistent handling classifications even if the values are not identical. The copying or setting of one HCF based upon another HCF may be done in an "upward" or "downward" fashion in a stack of carrier tags as might be appended to a data frame. For example, as carrier tags are stacked or added to data frame passing through the access network, values in the HCF of lower carrier tags already in the stack may be copied into HCF of newly added carrier tags higher in the stack. Values may also propagate downward when, for example, a value in a tunnel label HCF is carried into the EXP bits of a pseudowire label 'underneath' the tunnel label (for example, see the structures shown in FIG. 12). A setting of all such fields may also occur contemporaneously, such as when the encapsulation and carrier tagging of traffic is initially performed by a building aggregation system or layer 2 switch.

Depending on implementation, it may be appropriate to, for example, copy a handling classification value from a tunnel label to a PW label or vice versa, or to otherwise set these two fields to equal values or analogous values. As carrier tags are added to a data frame, it may also be appropriate to copy an existing handling classification value present in the data frame into a similar field in the newly added carrier tag data structure. In accordance with yet another exemplary implementation, a pseudowire label may receive the handling classification value just prior to being sent to a service edge. This implies that in some implementations the data frame may be transported partially or entirely through an access network without setting the pseudowire label to be consistent with the tunnel label, and then the pseudowire label value may be set as the data frame is prepared for handoff to the service edge or some other destination. This process would still accomplish communicating the handling classification value to the service edge via the pseudowire label even when the tunnel label is removed prior to reaching the service edge.

The present invention is not limited to any particular manipulations or sequencing of actions related to using a service emulation instance tag structure, such as a pseudowire label, or other form of demultiplexing or logical subinterface structure to convey handling classification information to network elements in an access network, a service edge or even a core network. This method of providing handling classification may be applied uniformly to all data frames regardless of any particular data protocol that happens to be encapsulated in a payload portion of each data frame.

In accordance with the present teachings, policing and other quality-of-service measures may be implemented as traffic enters the access network and as a first line of policing perhaps in addition to similar quality-of-service measures implemented at the service edge. This practice may be referred to as "dual policing" of customer traffic flows and may be implemented, for example, at the ports of the interface modules 710-716 of building aggregation system 114. In accordance with the present teachings, policing and other quality-of-service measures may be implemented in a variety of ways. Quality-of-service measures may be applied on a per-port or per-VLAN basis or other form of per-flow basis. It may also be possible to place collective limitations on any arbitrary collection of flows. For example, a customer may have two flows each having individual committed and burstable data rates. In addition, it may be possible to also ensure that the sum of the two flows at any moment in time is held below a certain maximum value in accordance with a contracted arrangement. A pool of users working for a small business enterprise may each have a two megabit per second committed rate and an eight megabit per second burstable rate, yet the maximum burst rate for the business enterprise may be capped at 100 Mbps. If a large number of the users try to perform higher bandwidth activities at the same time, some or all of them may be confined to somewhat less than the eight megabit per second rate per person during this exceptionally active interval.

Traditionally, TDM-centric services and Packet Services used separate physical or logical TDM facilities for transport. This was due to the fact that traditional packet switching equipment could not maintain the deterministic timing required for encapsulated TDM circuits. ATM was the first reliable means to emulate TDM circuits over a packet switched network, using ATM Adaptation Layer 1 (AAL1). However, ATM proved to be expensive and poorly suited for large volumes of variable length packets. Alternative protocols have since become preferred for data transport, yet these other protocols do not typically support the effective encapsulation/emulation of TDM circuits. By using the aforementioned QoS marking mechanisms available from MPLS and pseudowires, in conjunction with deterministic QOS now achievable by new generations of core network routers and the simple, efficient carrier-tag access network elements in accordance with the present teachings, it becomes possible to adequately emulate TDM circuits over variable length packet networks. Specifically, the present teachings enable to the use of pseudowires to emulate wideband (DS1) circuits in the local access network and broadband (STS-1/STM1) circuits in the international access networks. Customer DS1 circuits may be carried using a packet-centric DS3/OC-3/OC-12, alleviating the expensive lease which is currently used to provide those DS Is. This represents a dramatic savings opportunity through the leveraging of more economical broadband connections to carry a variety of packet data as well as emulated TDM circuits.

Customer premise equipment may communicate using signals that are formatted according to various time-division multiplexing signal formats. A service edge or a portion thereof may also be equipped to perform access-side communications using signals that are formatted according to various time-division multiplexing signal formats. Traditionally, these CPE and service edge would be coupled through a TDM circuit. Yet, in accordance with a preferred embodiment of the present invention, even these communications may be efficiently handled in a uniform manner with other types of communications flows as has been described herein.

Some possible TDM formats that might be used by CPE or service edge equipment are referred to as Plesiochronous Digital Hierarchy (PDH) signals and are the subject of various ITU recommendations, ANSI standards, ETSI standards and other standards promulgated by such bodies worldwide. Examples of TDM signals of this type are the DS-0, DS-1, DS-1C, DS-2, DS-3 and DS-4 signals plus the T1, E1, J1 signals and their related hierarchies. Still other TDM signals are known as the Synchronous Digital Hierarchy (SDH) signals. SONET and SDH signals such as OC-n optical signals and the analogous STS-n electrical signals are representative of synchronous TDM signals. These TDM signals may carry multiplexed voice signals or may carry data signals of other types which may or may not conform to the framing or channelization that the TDM signals were originally designed to support. The present invention is not limited to specific TDM signals or any specific manner in which traffic may be encoded or imbedded within the TDM signals.

In the case where TDM-formatted signals from a CPE are to be coupled through the access network to a TDM-oriented service edge, such as a Class 3 telephony switch, the signals may be packetized, encapsulated, carrier-tagged and transported as data frames as described herein. While in packetized form, the carrier-tagged communications may actually be transported over communications links, such as link 113 and links 1020, 1030 (described later), which are in fact TDM links such as SONET or SDH optical links. However, attempting to fulfill the TDM communications needs directly by grooming them onto the TDM link reintroduces the original problems of provisioning and handling channelized TDM access communications and forfeits advantages of packetization and of handling as carrier-tagged communications. The ability of an intermediary packetization protocol, such as ethernet, to faithfully deliver quality similar to a TDM circuit may also be enhanced by the measures described below in relation to policing, discard eligibility indicators and handling classification values applied to traffic-bearing data frames.

Figure 7:
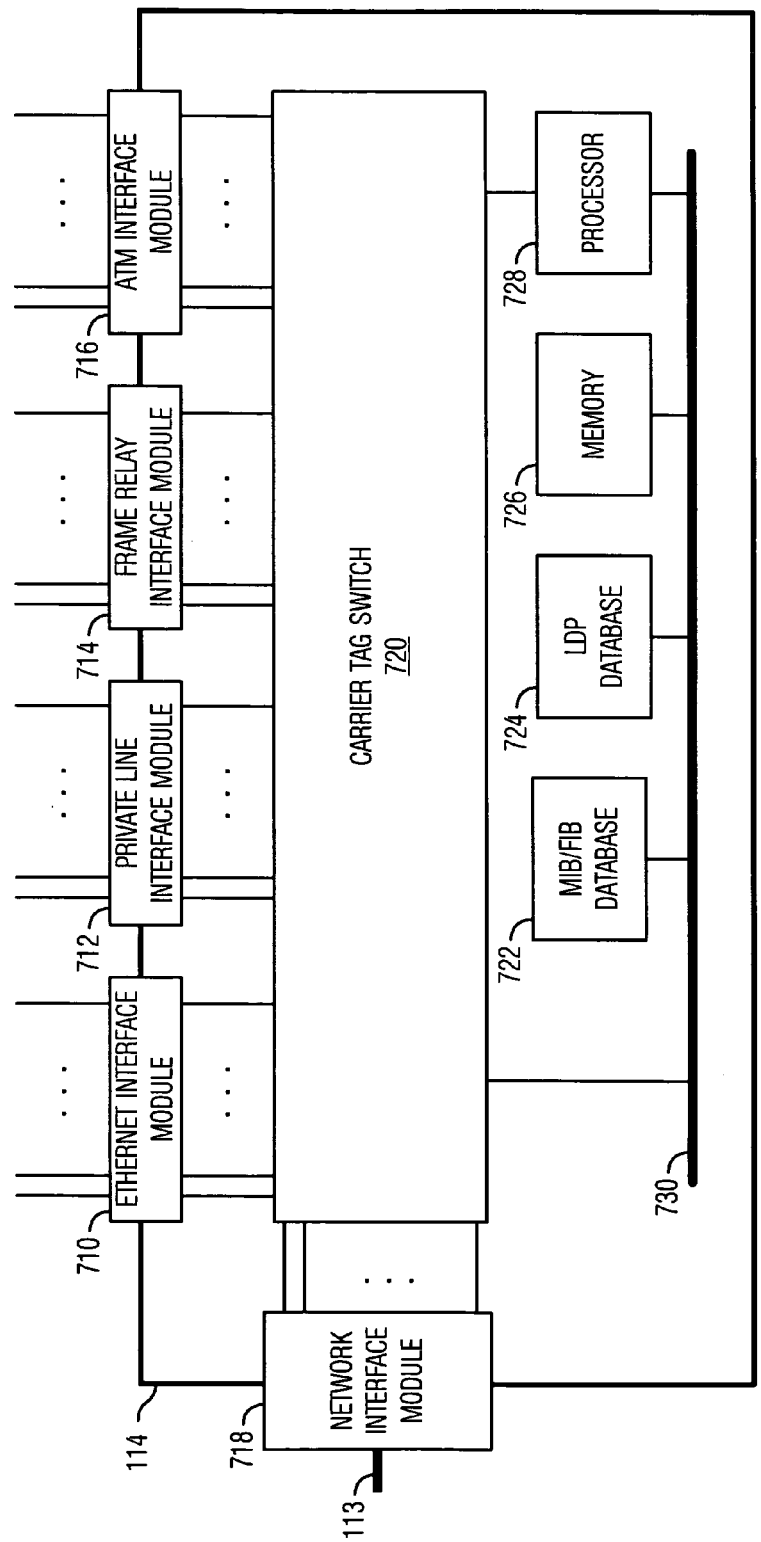
FIG. 7 illustrates component functions pertaining to a carrier tag enabled building aggregation system in accordance with an exemplary embodiment of the present invention.

FIG. 7 is a block diagram of one embodiment of the building aggregation system 114 that may be utilized in accordance with one embodiment of the present invention. Preferably, the building aggregation system 114 comprises one or more CPE interface modules, such as interface modules 710-716, a network interface module 718, a carrier tag switch 720, a management information base (MIB)/forwarding information base (FIB) database 722, a label distribution protocol (LDP) database 724 when pseudowires are used as the service emulation instances, memory 726, and a processor 728. The block diagram of FIG. 7 is provided for illustrative purposes only, and accordingly, components may be added, combined, or removed without varying from the scope of the present invention.

The CPE interface modules 710-716 provide specific interfaces to a particular type of CPE, such as Ethernet interface module 710, TDM private line interface module 712, frame relay interface module 714, ATM interface module 716, and the like. Generally, each type of CPE may require a specific physical interface, such as a DS1, a twisted pair, or the like, and on each physical interface, a specific signaling or electrical property is expected. Accordingly, it is preferred that the building aggregation system 114 provide various types of interfaces and, preferably, aggregate traffic from the various types of interfaces onto one or more service emulation instances or other forms of carrier-tagged flows.

The network interface module 718 is communicatively coupled to the layer 2 switch 118 and is configured to transmit data to and receive data from the layer 2 switch 118. In the preferred embodiment, the network interface module 718 is communicatively coupled to the layer 2 switch 118 via a TDM communications link, such as a DS3, and is configured to transmit and receive data via service emulation instances, such as, for example, pseudowires, VLANs, and the like.

The carrier tag switch 720, the MIB/FIB database 722, the LDP database 724, the memory 726, and the processor 728 are preferably communicatively coupled via a bus 730. The MIB/FIB database 722 and the LDP database 724 provide storage of data structures for mapping carrier tag values, such as service emulation instance mapping identifiers, to particular flows or ports. These databases may also contain information on how to process each flow and policing parameters to be applied to the flows. These databases may also include information about a number of demarcation devices remotely managed by building aggregation system 114. The processor 728 and memory 726 provide control and storage capabilities, respectively. The processor 728 may be any general purpose or special purpose processor, such as, for example, an Application Specific Integrated Circuit (ASICs), Network Processors, Complex Instruction Set Computer (CISC), Reduced Instruction Set Computer (RISC), or the like.

The processor 728 may be communicatively coupled directly to the carrier tag switch 720 to provide routing instructions between the CPE interface modules 710-716 and the network interface module 718. Furthermore, the processor 728 may be communicatively coupled to the CPE interface modules 710-716 and/or the network interface module 718 to provide further routing and message handling instructions.

In operation, the building aggregation system 114 maintains an association between a carrier tag and the port, and possibly logical flow, through which the customer's traffic is received. Thus, messages received from the CPE via the CPE interface modules 710-716 are prepended with the appropriate carrier tag to create a carrier tagged message or frame. The carrier tagged frame may be aggregated with similar frames from other flows and then transmitted to the layer 2 switch 118 (and to the service edge 112) via the network interface 718. The carrier tag may be prepended by the CPE interface modules 710-716, the carrier tag switch 720, and/or the network interface module 718. The carrier tag may be prepended as part of an encapsulation process wherein the original customer frame is wrapped within another framing header/footer having significance to handling of the frame through the access network.

Similarly, messages received via the network interface module 718 preferably include a carrier tag value as part of an encapsulated form. The service emulation mapping identifier is mapped to a specific port and flow of one of the interface modules 710-716. The carrier tag switch 720 removes the carrier tag from the incoming messages and transmits the message to the associated CPE in the appropriate format. This process is often referred to as decapsulating.

Carrier tag switch 720 or network interface module 718 may include queuing and scheduling functions to accomplish coupling of many customer flows onto communications link 113 for transmission toward a service edge. Network interface module 718 may also receive control and management communications from remote elements along link 113. These communications may relate to determining or affecting operational status, provisioning of flows, determining of carrier tag values, etc. involving building aggregation system 114 or demarcation devices coupled thereto.

In accordance with a preferred embodiment, network interface module 718 may particularly intercept communications within a particular VLAN subinterface which has been set aside for provisioning, management and supervisory purposes. Such a technique is further disclosed in U.S. patent application Ser. No. 10/858,868 entitled "System and Method for Monitoring, Controlling and Provisioning a Telecommunications Access Network", which is incorporated by reference herein in its entirety.

Figure 8:
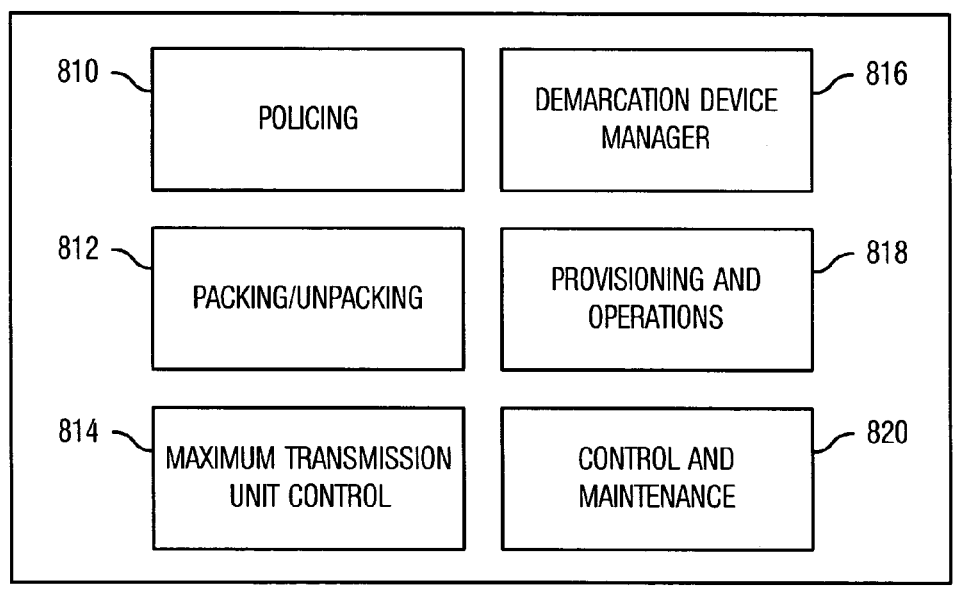
FIG. 8 illustrates a block diagram depicting functional components in a carrier tag enabled building aggregation system in accordance with an exemplary embodiment of the present invention.

FIG. 8 illustrates some of the functions that may be performed by the building aggregation system 114 in accordance with one embodiment of the present invention. The functions described herein may be performed by software, hardware, or some combination thereof. Furthermore, the functions may be performed by one of the elements, or a combination of the elements, of the building aggregation system 114 discussed above with reference to FIG. 7.

For traffic originating at a CPE and bound for a service edge, a building aggregation system 114 receives messages from multiple customer CPEs, the messages being received along different physical or logical ports associated with each customer flow. The building aggregation system appends one or more carrier tags to the incoming messages and otherwise encapsulates or processes the messages to prepare them for transmission through the access network. The building aggregation system sends the carrier-tagged messages into the access network, preferably in the form of an aggregated flow over a wideband or broadband communications link. Likewise, the building aggregation system operates in a complementary manner for traffic coming from a service edge that is bound for CPE. The building aggregation system receives carrier-tagged messages that have traversed the access network, interprets the carrier tags to determine where to distribute the message, 'decapsulates' the messages to remove the carrier tags, and distributes the messages to the appropriate physical and logical ports leading to the CPE.

To properly route traffic in either direction between each CPE flow and a corresponding access tunnel, service emulation instance or logical networking tagged path, the building aggregation system maintains an association between a customer interface port and a particular carrier tag value or set of values. Where service emulation instances are used in the access network, the building aggregation system may maintain an association between customer-facing ports and a service emulation instance mapping identifier. Where pseudowires are used in the access network, the building aggregation system may maintain an association between customer-facing ports and a pseudowire label value. One or more tunnel labels or LSP labels may also be associated with customer ports, either directly or indirectly by association with pseudowires or service emulation instances. Any of these associations may be maintained, for example, in a look-up table which may be referred to as a management information base (MIB) or a forwarding information base (FIB). As described elsewhere herein, these associations may be established by negotiation or coordination with other access networks elements or by control applied to the building aggregation system by a provisioning system. The building aggregation system also performs functions related to controlling traffic volumes and related to remotely managing demarcation devices.

As depicted in FIG. 8, the functions of a building aggregation system include a policing function 810, a packing/unpacking function 812, a maximum transmission unit (MTU) control 814, a demarcation device manager 816, a provisioning and operations function 818, and a control and maintenance function 820.

The policing function 810 is responsible for monitoring a user's traffic and controlling the rate at which customer traffic enters the access network. Policing function 810 may involve marking or dropping of customer packets or frames which exceed configured threshold values. Dropping or discarding of packets may occur when traffic from the customer exceeds a maximum data rate. Packets that represent an excessive data rate are simply not forwarded to the access network. When this happens, the policing function 810 may notify the CPE of the data loss, whereupon the CPE may throttle back or take action to recover from the lost data. The building aggregation system may also engage in customary flow control coordination with CPE to regulate incoming data rates of flows, for example, using "pause" or "ready to receive" control messages of some nature that are well known among those of ordinary skill in the art.

In contrast to dropping of packets, marking relates to designating which packets, if any, may be dropped later during transmission if the network or a network element becomes too busy to handle all of the user's traffic. Generally, a user contracts with a service provider for a guaranteed minimum data rate, as well as an absolute maximum or "burstable" rate that may be supported as long as the network is not too congested to handle it. At times, the user may attempt to send traffic at a rate in excess of the guaranteed rate. While the network may generally accommodate the higher data rate in these situations, it is desirable to set a discard eligibility bit in the message header. This allows downstream network elements to selectively discard some of the user's traffic if they are overburdened with other network traffic. In accordance with a preferred embodiment, the least significant bit (LSB) within the Experimental field of an MPLS label maybe used to indicate discard eligibility. In effect, when a customer has exceeded a guaranteed data rate and begins to experience data loss due to network congestion, the customer may reduce data rate or take other measures until the network congestion subsides. In some cases, transport protocols operating within CPE may sense the data loss and may automatically perform flow control to effectively reduce the data rate. Policing function 810 may also encompass metering or rate limiting to adjust the timing of forwarding of packets for better control of variable rate traffic.

In accordance with a preferred embodiment of the present invention, policing of customer traffic may extend across multiple service types and multiple logical or physical ports. For example, a customer may contract for two individual flows having certain committed minimum and maximum burstable rates. The QoS measures implemented in the building aggregation system may also control the sum of the two flows to remain below a certain limit, even if the flows are of different types or enter the building aggregation system along different ports. Minimum and maximum rates may even be applied in a hierarchical nature, for example, by company, department, employee, device, service type or specific flow.

The packing/unpacking function 812 provides the necessary reformatting of traffic necessary to convert traffic between a form suitable to the CPE and a form suitable for transmission through the access network. As described elsewhere herein, this function may encompass encapsulation and adding of carrier tags as well as the complementary processes of decapsulation and removal of carrier tags. This function may also relate to removal of extraneous data or fields that are part of a native data link protocol but are unnecessary for transport in an encapsulated form through the access network. For example, an HDLC frame received in a bit stream from a CPE will contain flags to delimit the endpoints of the frame, as well as possibly some stuffing bits. Prior to traversing the access network, these aspects may be removed.

Another possible role of packing/unpacking function 812 relates to terminating TDM links from CPE that are used to carry packet, frame or cell data. For example, a frame relay customer (such as customer 116c in FIG. 1) may use a DS1 link to communicate frame relay traffic to the building aggregation system. In practice, the frame relay traffic from the CPE 116c, although passing through a DS1 line in the building riser, may be extracted as frame relay frames by the packing/unpacking function 812 and coupled into, for example, FR-type service emulation instances across the access network. This is more efficient than passing the FR-laden DS1 communications, as such, in a TDM-type service emulation instance through the access network. The DS1 circuit would unnecessarily reserve a constant bit rate bandwidth at all times whereas carrying the frame relay traffic allows for multiplex gains, including statistical multiplexing.

Yet another possible role of packing/unpacking function 812 relates to adapting packet size or frame size of received traffic to a size that is amenable or preferable for transport over the access network. For example, with due regard to latency considerations, multiple 53-byte ATM cells may be concatenated and delivered within a single frame across the access network. It is also conceivable that large customer-submitted packets might be split into smaller packets or frames before being sent through the access network.

With all of the manipulations just described, another entity that eventually receives the traffic may need to perform complementary actions to reconstitute a flow in its native form. Where the building aggregation system 114 is a recipient of flows that have been affected in this manner, packing/unpacking function 812 may need to perform the complementary reconstitution processes.

The MTU transmission control function 814 is an optional function that monitors whether a maximum transmissible frame size or length is exceeded.

The demarcation device manager 716 may provide a variety of functions related to the management and control of CPE and/or demarcation devices. Demarcation device manager 716 may also provide diagnostic capabilities, such as invoking loopback testing, transmitting test messages/patterns, monitoring the connectivity between the demarcation device (and possibly the CPE) and the building aggregation system 114.

The provisioning and operations function 718 provides the ability to provision service emulation instances and the mapping between CPE flows and the service emulation instances. Generally, a control and maintenance system (not shown) preferably provides provisioning commands to the building aggregation system 114, which allocates the necessary resources and maintains a correlation between CPE flows and the virtual circuit. The correlation is preferably maintained via a service emulation mapping identifier such as a pseudo-wire label, a VLAN tag, or the like. The association between a CPE flow and the service emulation mapping identifier may be maintained by, for example, a table stored in memory. Additionally, the bandwidth and QoS associated with each service emulation instance mapping identifier is also specified and correlated to each service emulation instance via the provisioning and operations function 718.

The control and maintenance function 720 provides management and control functionality for the building aggregation system 114, such as provisioning, operations, maintenance, performance monitoring, and the like. Preferably, the control and maintenance function 720 utilizes an in-band control and maintenance flow. In this manner, a remote control system (not shown) may utilize existing communications links without the need of providing a separate communications link solely for control and maintenance functions.

The use of an in-band maintenance and control channel is described further is U.S. patent application Ser. No. 10/858,868 entitled "System and Method for Monitoring, Controlling and Provisioning a Telecommunications Access Network", which is incorporated herein by reference.

Figure 9:
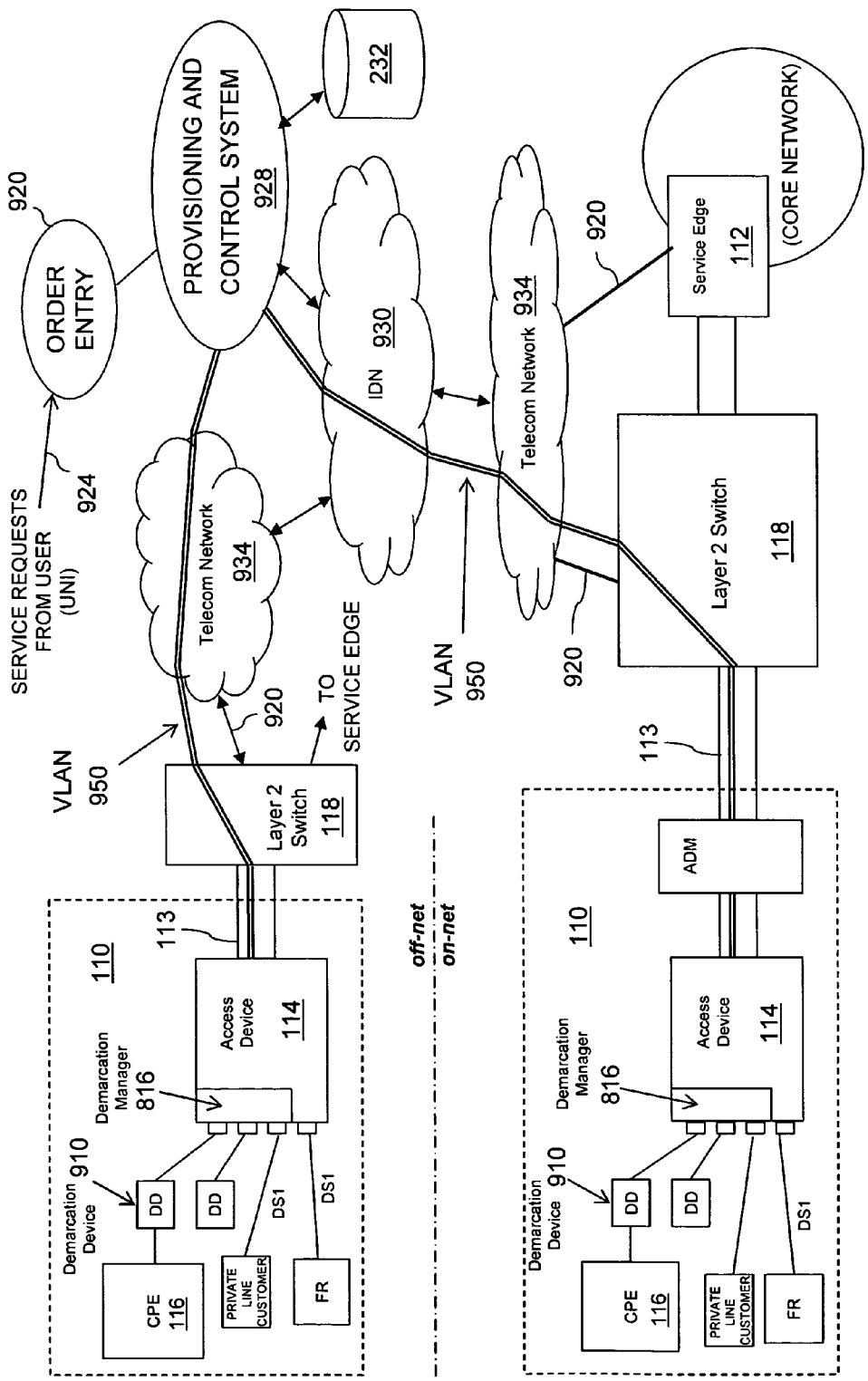
FIG. 9 illustrates a diagram of a telecommunications network as being provisioned and controlled in accordance with an exemplary embodiment of the present invention.

FIG. 9 is a network diagram depicting an access network in accordance with an exemplary embodiment of the present invention. In particular, FIG. 9 depicts the manner in which demarcation devices may be associated with each building aggregation system 114 and in which the demarcation devices and building aggregation systems may be managed and controlled remotely by communications with a provisioning and control system 928. As described in conjunction with earlier figures, a variety of CPE 116 at various customer sites 110 are coupled through respective building aggregation systems 114 and layer 2 switches 118 to reach a service edge 112.

Of particular note, ethernet demarcation devices (DD) 910 are shown to be coupled between certain ethernet CPEs 116 and building aggregation system 114. The demarcation device is the point at which a customer's network or CPE connects to the access service provider's network. Generally, from this demarcation point and extending in the direction of the service edge or the remainder of the network, a service provider is responsible for reliably carrying traffic and for maintaining the operational state of the facilities, such as cabling and switching equipment. This may include responsibility for cabling through the building riser. Past the demarcation point and on the customer network side, the customer is primarily responsible for assuring reliability and integrity of the connection with their network, although sometimes the service provider may assist in troubleshooting problems occurring on the customer side of the demarcation device.

Demarcation device 910 may play an active role in supporting customer flows. The demarcation device through which ethernet traffic is passed from customer to access network and vice versa, may be able to collect and report statistics useful to the customer in the service provider. The demarcation device may also participate in flow control to regulate the rate at which traffic from the customer is allowed to enter the access network. For test purposes, a demarcation device may also be able to perform loopback of various types both on the customer facing side in the network facing side to facilitate troubleshooting of customer network and building cabling.

Generally, a demarcation device will serve a group of users or a particular network of equipment such as workstations and servers. In an office building, for example, there may be one demarcation device per floor in the building. Otherwise, there may be one demarcation device assigned to each significant cluster of users or to a particular network domain.

By virtue of demarcation manager 816, a given building aggregation system 114 may serve as a custodian of numerous demarcation devices 910. Configuration information for controlling the subtending demarcation devices 910 may be maintained by the demarcation manager 816 and instructions pertaining to how the demarcation devices are to handle particular customer flows are dispatched to the demarcation devices 910 via the associated demarcation manager 816. Building aggregation system 114 may be responsible for controlling the associated demarcation devices and monitoring the operational state of the devices. External elements may send provisioning and test invocation commands affecting the demarcation devices via the building aggregation system, which may then dispatch the appropriate commands addressed to implicated demarcation devices.

Also in FIG. 9, a centralized provisioning and control system 928 is shown to be coupled to a number of network elements, such as layer 2 switches 118 and service edge 112, through communications networks 934 and internal data network 930. Through these networks and control connections 920, provisioning and control system 928 may communicate control information with the network elements. Networks 930, 934 may be a packet-switched network, such as an IP network, wherein each network element is reachable by a unique IP address. Internal data network 930 may actually be implemented as a virtual private network within network 934.

Through control connections 920, provisioning and control system 928 may coordinate the function of many elements in an access network and also may perform a network management function by monitoring the operational status of the network elements and by maintaining a database 932 of information pertaining to the network. This information may include topology, information regarding specific flows or tunnels established in the network, customer-specific information, network management information bases (MIBs), IP addresses for control interfaces to network elements, etc. Provisioning and control system 928 may or may not be the same control system involved in comprehensive control of core network or service edge components.

In accordance with a preferred embodiment, centralized provisioning and control system 928 may exercise control over access network elements, particularly building aggregation system 114 and demarcation devices 910, through a VLAN channel 950. This is a form of "in-band" control channel in that the control signals will follow the same path or link, mainly communications link 113, that is used for carrying customer traffic. This approach may be a very useful alternative to the prospect of having to provide separate network connections 920 to each access device 114 by a connection other than communications link 113. Furthermore, in accordance with a preferred embodiment of the present invention, a VLAN control channel reaching building aggregation system 114 may also be used to remotely or indirectly control each demarcation device 910 via demarcation manager 816. These aspects are particularly important to a service provider where communications link 113 is a DS3 link leased from another party.

Control signals sent to a building aggregation system 114 are recognized by being tagged with a particular VLAN tag value that is reserved for control purposes and is preferably not used for tagging of customer flows. Some degree of control and maintaining of addressability, state and configuration information may be delegated to demarcation managers 816 by provisioning and control system 928.

Whereas provisioning and control system 928 may be able to establish flows through the access network by dispatching commands and configuration information to various network elements, another function, order entry system 926, may indicate to the provisioning and control system 928 what flows need to be set up.

The customer may request access network services through order entry system 926 in a variety of ways. A user network interface (UNI) 924 is shown to represent a variety of ways in which a customer may communicate with the order entry system, and may include a direct connection through a network 934, a dial-up connection, a client-server session, a Web interface or other forms of UNI which are well known. Alternatively, access service may be requested by a user via a telephone conversation with a representative of the service provider or an automatic voice response unit of some nature.

It is particularly worth noting that a user acting through some form of interface may be able to freely provision services, subject to validation and account permissions, and cause provisioning of any type of flows immediately and without requiring any manual intervention by the service provider's personnel. Through tools such as customer web pages, a customer 'cockpit' can be presented showing the customer's current settings, provisioned flow parameters, bandwidth usage, network performance characteristics, etc. A user may be able to activate user interface and have the network, in near real-time, perform provisioning actions in response to the user's request. For example, a user may be able to manipulate sections of a pie chart control and instantly shift the bandwidth proportion for IP traffic versus ATM traffic for their account.

Having a single, highly responsive provisioning system would be highly beneficial to a service provider. Presently, many service providers offer multiple legacy services which are provided in the same network region. As such, there are typically separate provisioning and traffic engineering systems associated with each network layer as well as each protocol associated with each network layer. Some service providers may have multiple Layer 1 (TDM) provisioning systems as well as separate L2 provisioning systems for ATM, Frame Relay, Ethernet, etc. In addition, IP networks have separate provisioning systems. The use of a generic L2 aggregation and switching architecture in accordance with the present teachings may enable the use of a single provisioning system for any layer 2 service.

With prior art approaches, if a customer needs to increase their Frame Relay, ATM and Ethernet circuits, at least three provisioning systems must be involved as well as the TDM provisioning systems associated with the bandwidth required for the circuits. Each circuit typically has a specific number of discrete TDM channels associated with it so any bandwidth or topology changes require provisioning changes in multiple layer 1 and layer 2 systems. By using a common switching and aggregation mechanism, the encapsulated protocols are hidden from the network elements and associated provisioning systems. This yields the capability of provisioning any of the encapsulated protocols without regard to the nature of the protocol.

A wide variety of popular layer 2 and layer 1 protocols may all 'look the same' to the access network once they are encapsulated as described herein. A single provisioning system suffices to provision access communications circuits on an end-to-end basis. Further, since the generic L2 network is decoupled from the underlying L1 network, TDM provisioning is not necessarily required with every new L2 connection. Layer 1 provisioning (by adding more physical connections or adding wavelengths to an existing optical connection) is only necessitated when the aggregate traffic over a link threatens to exceed the aggregate capacity of the link. Due to new efficiencies created in accordance with the present teachings, this situation is now more likely to be welcomed by the service provider because the cost of the additional L1 facility is already easily justified by the traffic in an existing pipe and the traffic may now be readily shared among both of the pipes.

The manner in which a service-agnostic access network may be provisioned in accordance with the present teachings may also facilitate gradual transitioning from one service type to another. Whereas this transitioning may be challenging and burdensome to accommodate using prior art techniques, the present invention easily accommodates these types of changes, however sudden or gradual. For example, a customer who is accustomed to frame relay or ATM service may be contemplating switching to IP or latest services in order to benefit from the latest technologies converged networks such as IP telephony or voice-over-IP. Such a customer has had to contemplate either a) finding ways to accommodate the voice-over-packet signals on existing frame relay or ATM service, or b) switching wholesale from ATM/frame relay to having a packet-switched network interface on the customer premise or at least accessible via an access circuit to a service provider. Another common scenario is that a customer already uses VPN telephony services through a TDM connection of some nature and is contemplating moving to a packet-switched transport and to Internet telephony. It is desirable to provide a gradual transition path between TDM-oriented services and packet-switched services. This is preferable to mandating that the customer perform a sudden cutover from purely TDM services to purely packet-switched services, which could entail downtime and considerable capital expenditure investment.

Figure 10:
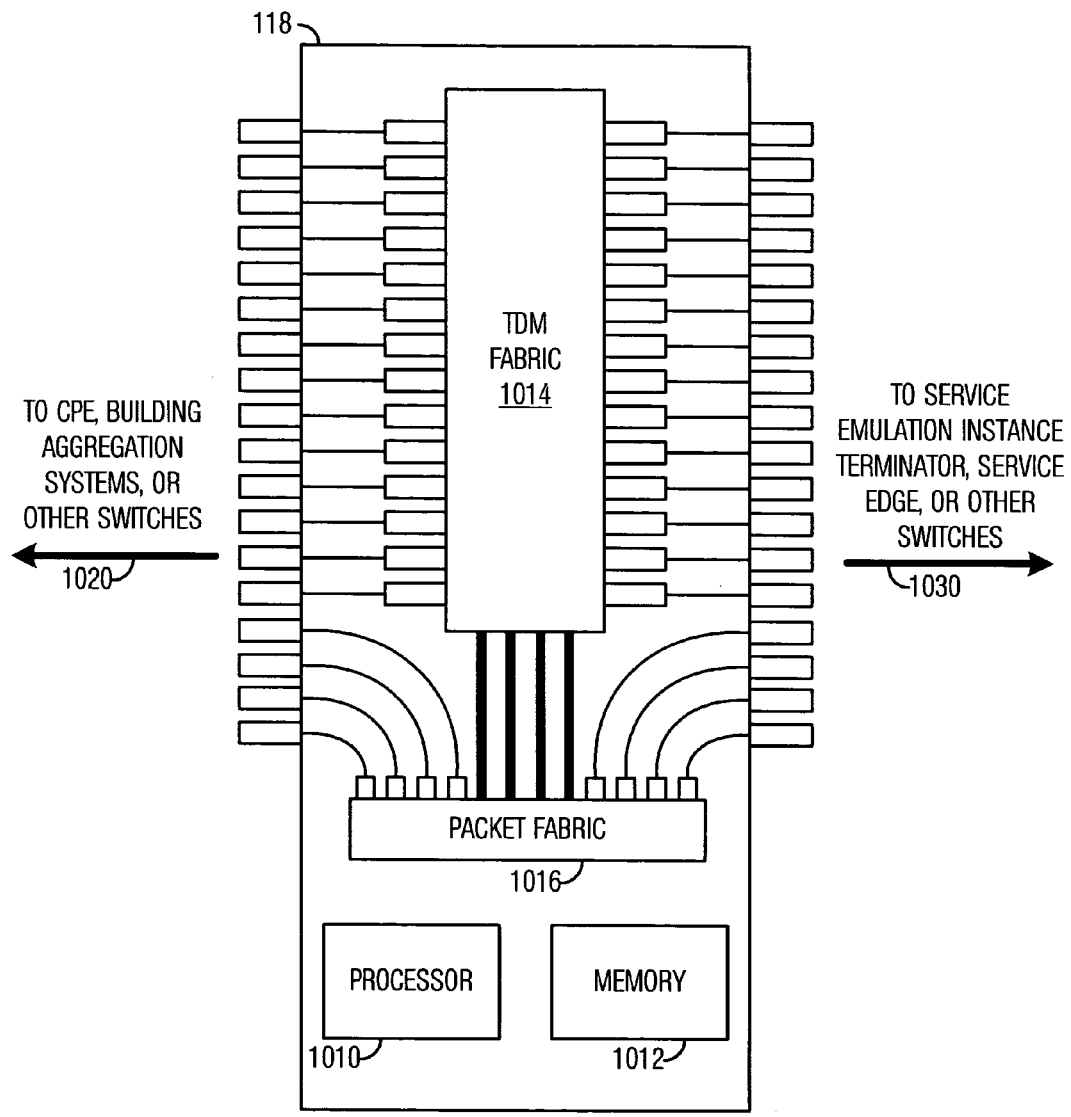
FIG. 10 illustrates functional components in a carrier tag enabled layer 2 switch in accordance with an exemplary embodiment of the present invention.

FIG. 10 is a block diagram including an exemplary embodiment of a layer 2 switch that may be used in accordance with an embodiment of the present invention. The layer 2 switch 118 comprises a processor 1010, memory 1012, a TDM fabric 1014, and a packet fabric 1016. Generally, the processor 1010 with the memory 1012 provides the processing capabilities to provide switching/routing instructions, provisioning, maintenance, and control functionality. The TDM fabric 1014 provides the ability to switch or route TDM traffic, and the packet fabric 1016 provides the ability to switch or route packetized traffic.

The layer 2 switch 118 includes CPE-side ports 1020 and service-edge-side ports 1030, each of which may support multiple types of connections and protocols. In an embodiment of the present invention, any port could face either CPE or service edge, on a port-by-port basis. The CPE-side ports 1020 may communicatively couple to CPE, or equipment communicatively coupled between the CPE 116 and the layer 2 switch 118. The equipment on the CPE-side of the layer 2 switch 118 may include, for example, CPE 116, the building aggregation system 112, another switch, routers, hubs, add/drop multiplexers, or the like. In contrast, the service-edge-side ports 1030 are communicatively coupled to the service edge 114 or equipment communicatively coupled between the layer 2 switch 118 and the service edge 114. For example, network elements that may communicatively couple to the service edge side ports may include the service edge 114, the service emulation terminators 130, another switch, routers, hubs, multiplexers, or the like.

The CPE-side ports 1020 and service-edge-side ports 1030 provide connectivity for TDM traffic and packetized traffic. TDM traffic can be received via one or more optical communications links that support high-speed, high-volume traffic, such as, for example, an OC-12, OC-48, OC-192, or the like. Other communications links, such as T1 or DS3 signals over electrical, optical or wireless connections, may also be used. Packet traffic can be received via, for example, one or more GbE or 10 GbE communications links. The TDM traffic may comprise packets transmitted via a TDM transport, and the packet data may comprise TDM data transmitted via a packet transport.

It should be noted that the TDM fabric 1014 and the packet fabric 1016 can be interconnected, via TDM/packet conversion framers as described later, thereby allowing incoming TDM traffic to be routed to an outgoing TDM port or an outgoing packet port. Similarly, incoming packet traffic may be routed to an outgoing packet port or an outgoing TDM port. The need to port traffic across TDM and packet fabrics may arise from several practical scenarios. In one situation, a customer site may be coupled to the layer 2 switch through a TDM (T1, DS3) connection over which packetized data may be sent, using X.86 or GFP, for example. Consequently, although the base transport is TDM, the traffic may actually represent a packetized flow that is appropriate to be aggregated with other packet data flows and forwarded to a service edge as such. (In this scenario, it is also possible that the packetized flow, in turn, carries or emulates a TDM circuit, resulting in a protocol stacking of TDM-over-packet-over-TDM.) In another situation, some of the packetized traffic from a customer received along a packet connection may need to go to a TDM-oriented service edge. Either of these situations requiring TDM/packet crossover may be the subject of flow management or provisioning control implemented within, or externally directed to, layer 2 switch 118.

The use of two separate fabrics depicted in FIG. 10 is only one example implementation. In an alternative implementation, layer 2 switch 118 may employ a single switching fabric in conjunction with port cards, or functions at each port, which convert the various types of communication into a unified format compatible with the switch fabric. The present invention is not limited to either of these proposed designs or from being implemented in yet another way.

Figure 11:
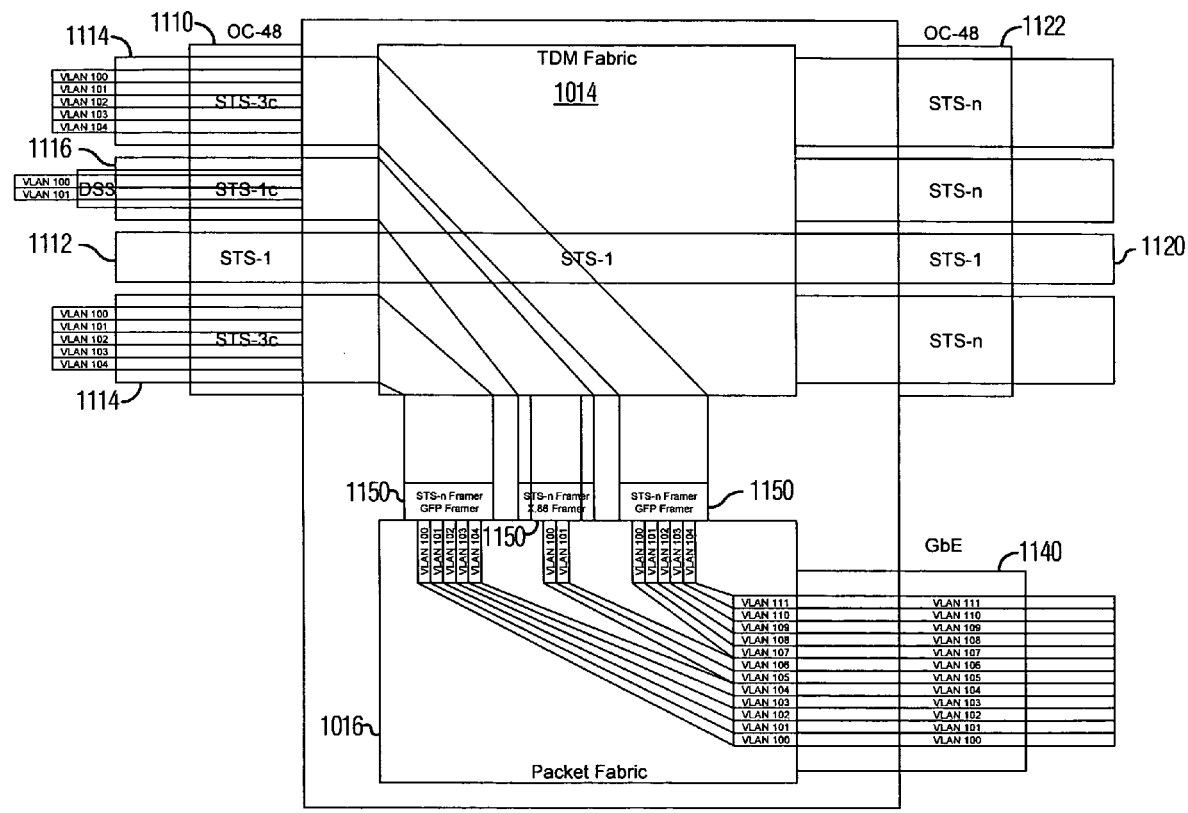
FIG. 11 illustrates a communications flow diagram depicting the handling of flows and carrier tag values through a carrier tag enabled layer 2 switch in accordance with an exemplary embodiment of the present invention.

FIG. 11 is a diagram illustrating the switching function of layer 2 switches in accordance with an embodiment of the present invention. It should be noted that FIG. 11 illustrates an embodiment in which VLANs are utilized as a form of carrier-tagged flow. As discussed above, other mechanisms, such as pseudowires or the like, may be used, with switching behavior then being based upon interpretation and manipulation of pseudowire labels, tunnel labels, etc. A flow requiring such crossover may be identified by having a particular carrier-tag value and, accordingly, it may be said that the routing of the frames of a flow from packet to TDM or vice versa may be determined based upon the value of one or more carrier tags within the traffic-bearing frames.

Illustrated is an incoming OC-48 optical carrier 1110 comprising an STS-1 line signal 1112, a first STS-3c line signal 1114, an STS-1c line signal 1116, and a second STS-3c line signal 1118. The STS-1 line signal 1112 is routed via the TDM fabric 1014 to an outgoing STS-1 line signal 1120 on an outgoing OC-48 optical link 1122.

Traffic on the other line signals, e.g., the first STS-3c line signal 1114, the STS-1c line signal 1116, and the second STS-3c line signal 1118, are shown to be routed by the TDM fabric 1014 to the packet fabric 1016. The packet fabric 1016, based upon the carrier tag, routes the traffic to a packet-based communications link, such as the GbE link 1140. It should be noted that traffic routed between the TDM fabric and the packet fabric may require a framer 1150 to format the traffic appropriately for the associated transport. Generally, the framers 1150 extract the payload from the STS-n Synchronous Payload Envelope (SPE) and decapsulate the X.86 or GFP packet (and the reverse), presenting the Layer 2, labeled packet to the switch function for routing.

FIG. 11 also illustrates an embodiment in which, when VLANs are utilized to implement a carrier-tagged flow, VLAN identifiers are locally significant at each interface and may be changed on a hop-by-hop basis. For example, each of the first STS-3c line signal 1114, the STS-1c line signal 1116, and the second STS-3c line signal 1118 have a VLAN utilizing VLAN identifier 100. The packet fabric 1016 aggregates the VLANs from each of the first STS-3c line signal 1114, the STS-1c line signal 1116, and the second STS-3c line signal 1118 for transport across a single GbE communications link 1140. In the course of being routed to link 1140, some flows that entered along optical carrier 1110 will undergo a change of VLAN identifiers to assure uniqueness at the outbound interface. For example, the 'VLAN 100' flows indicated within line signals 1114, 1116 and 1118 will have to be reassigned distinguishable new values as shown.

Of course, some coordination among network elements and management of data in one or more management information bases will assure that when traffic tagged with VLAN value '100' is received elsewhere, it will be understood that this represents the flow that was introduced within line signal 1114 having a VLAN tag value of '100'. As an alternative to changing the existing VLAN carrier tags in this manner, it may be desirable to simply stack an additional VLAN tag structure onto the traffic to achieve the required uniqueness. This outermost VLAN tag may then be stripped off or 'popped' when the aggregated flows reach a point where they will be separated again, such as at a service edge. A manner in which VLAN tags may be stacked is sometimes known as "Q-in-Q", referring to application of principles in IEEE Standard 802.1Q. This approach also requires some coordination among elements involved in routing and terminating the flows.

Figure 12:
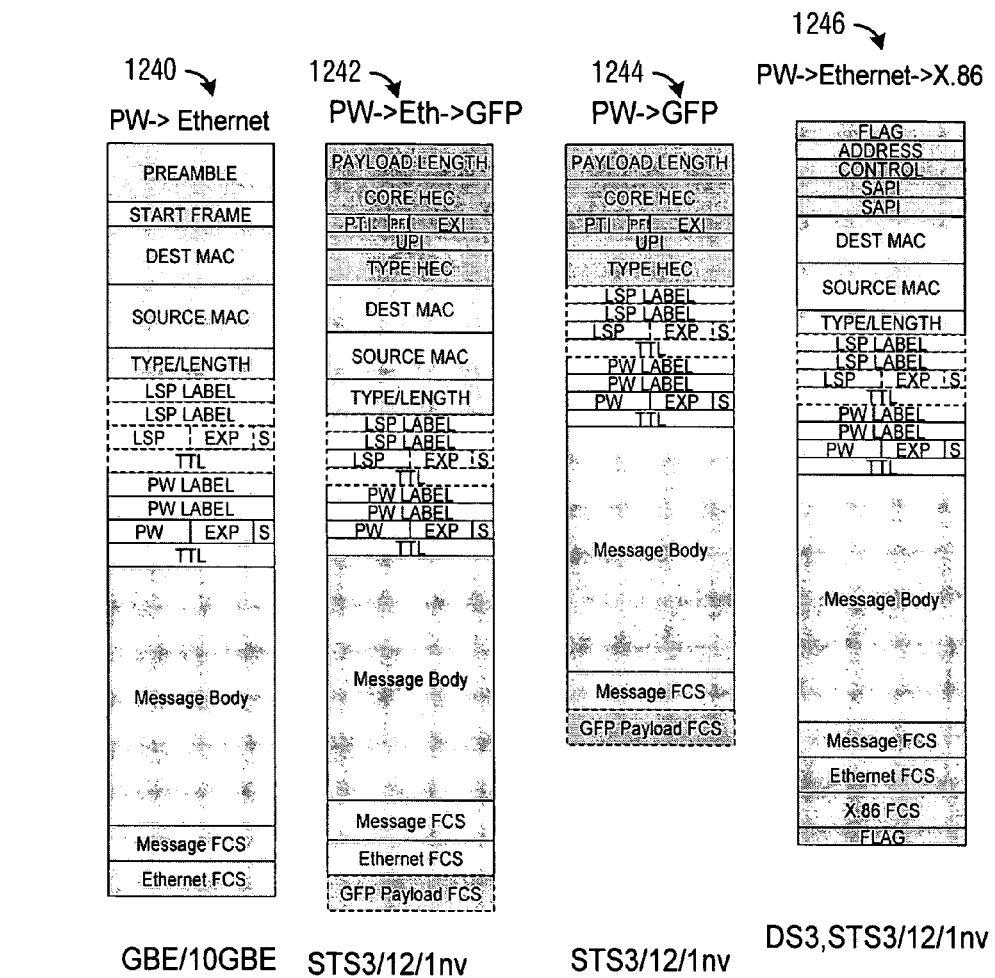
FIG. 12 through 15 illustrate the format of communications frames employed in an access network in accordance with an exemplary embodiment of the present invention.
Figure 12:
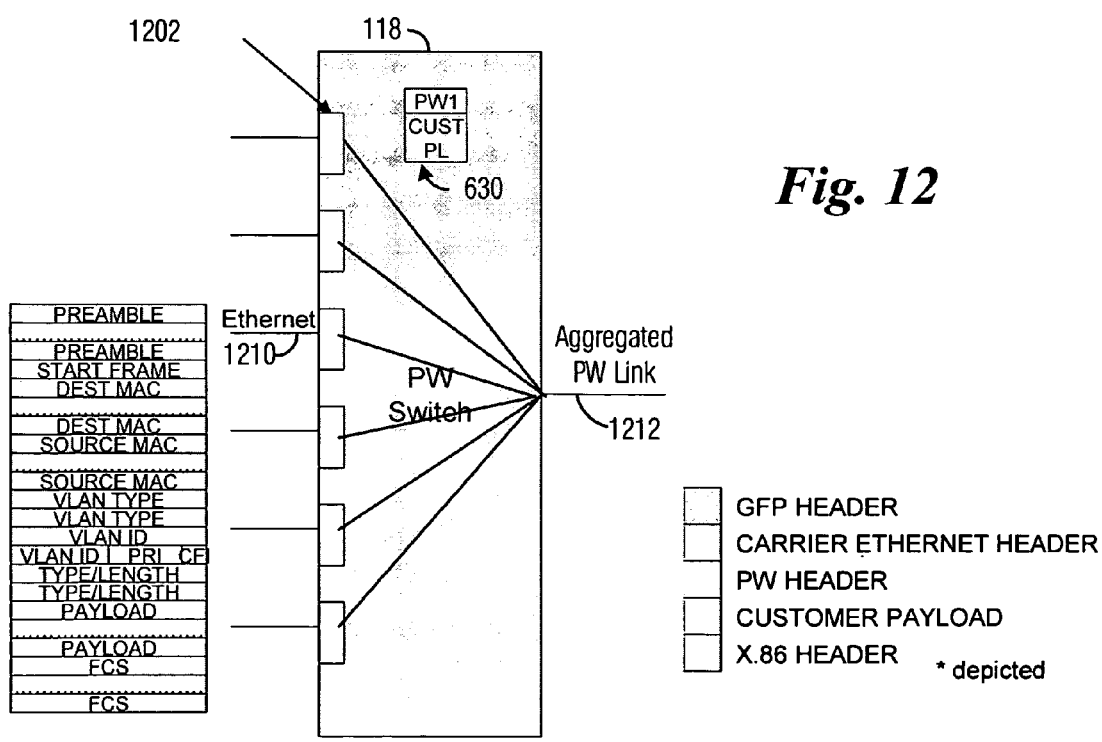

FIG. 12 illustrates framing formats in accordance with an exemplary embodiment of the present invention. It should be noted that FIG. 12 illustrates an embodiment in which pseudowires are utilized as the carrier-tagged flow and wherein layer 2 switch 118 directly receives a customer flow and performs the carrier tagging and encapsulation functions. Of course, building aggregation system 114 may perform a similar function and other methods and apparatuses may be used. Regardless of which elements form and act upon carrier-tagged traffic, the frame structures depicted in FIG. 12 are representative of typical signals in the access network in accordance with the present teachings.

An encapsulation function 1202 receives customer payload information and encapsulates the customer payload by prepending a carrier tag, as discussed above with reference to FIG. 3, and other carrier header information. It should be noted that, in some networks, the traffic received by the layer 2 switch 118 may already be encapsulated. In these situations, the layer 2 switch 118 may not need to perform an encapsulation function 1202, and may simply switch or route the traffic based upon the carrier tag already present.

For example, in FIG. 12 the layer 2 switch 118 routes traffic between an Ethernet communications link 1210 (which may be communicatively coupled to CPE in some arrangements) and an aggregated pseudowire communications link 1212. The layer 2 switch 118 receives a flow in the form of Ethernet frames, each frame including Ethernet header information and customer payload information. The layer 2 switch 118 prepends a pseudowire label to the Ethernet frame as indicated by the encapsulated message 1230. It should be noted that the Ethernet frame received may be left substantially unmodified, and the pseudowire label, and other encapsulating information, is placed around the received Ethernet frame. It should also be noted that the Ethernet frame check sequence (FCS) as received in the Ethernet frame may optionally be included as is rather than being deleted or recalculated by the layer 2 switch 118.

Multiple flows may be aggregated and carried along the aggregated pseudowire communications link 1212. Traffic in the aggregated pseudowire communications link 1212 may appear in different forms dependent upon the transport mechanism used to transport the aggregated link. In one embodiment, the pseudowire flows are transmitted via an Ethernet interface as indicated by reference numeral 1240. In this embodiment, the pseudowire frame is encapsulated in an Ethernet frame, including a new Ethernet FCS. It should be noted that the original Ethernet FCS may be retained and not affected by the calculation of the new Ethernet FCS. Thereafter, the aggregate link may be transmitted on the Ethernet interface.

In another embodiment, the aggregated pseudowire communications link 1212 is transmitted on a SONET/TDM interface, such as, for example, an STS-3/12/1nv communications link, wherein the pseudowire frame is encapsulated in an Ethernet frame and a GFP frame, as indicated by reference numeral 1242. In this embodiment, an Ethernet frame is wrapped around the pseudowire frame, optionally prepended with a LSP label and then encapsulated into a GFP frame. The original FCS may be unmodified, and a new FCS value is calculated for the new Ethernet frame.

In yet another embodiment, the aggregated pseudowire communications link 1212 is transmitted on a SONET/TDM interface, such as, for example, an STS-3/12/1nv communications link, wherein the pseudowire frame is encapsulated in a GFP frame, as indicated by reference numeral 1244. In this embodiment, a GFP frame is wrapped around the pseudowire frame. The original FCS may be unmodified, and a new FCS value is calculated for the new Ethernet frame.

In yet another embodiment, the aggregated pseudowire communications link 1212 is transmitted on a SONET/TDM interface, such as, for example, a DS3, an STS-3/12/1nv communications link, or the like, using X.86, as indicated by reference numeral 1246. Similar to the other embodiments, this embodiment wraps an Ethernet frame around the pseudowire frame, and then encapsulates the new Ethernet frame into an X.86 frame. The original FCS is unmodified and new FCS values are added for the Ethernet and X.86 framing. Additional flags may be added as appropriate. Other protocols, framing techniques, and transports may be used.

In any of the frames depicted by reference numerals 1240-1246, multiple carrier tag portions, such as the LSP labels or pseudowire labels, may appear within each frame to represent nesting of tunnels or nested encapsulations. Referring briefly back to FIG. 4, this would correspond to the situation in which, for example, a single large tunnel between layer 2 switch 118 and service emulation instance terminator 130 might be used to encompass all of the flows within label switched paths 210 and 220. Traffic in LSP 210 may receive an additional outer tunnel label as it passes through layer 2 switch 118. The nesting of tunnels may become more useful as an increasing number of aggregation stages and routing hops are applied in the access network.

In FIG. 12, the message body and message FCS portions depicted in frames 1240 through 1246 may constitute a payload of the carrier-tagged frame whereas the remainder of the frame may be referred to as "encapsulation structure" added to the payload. The carrier-applied labels added as a part of this encapsulation are shown in these examples as LSP labels and PW (pseudowire) labels, although any other type of structures could be used. As described above, multiple ones of the carrier tags, namely multiple LSP labels and/or PW labels, may be present in a frame. In some implementations, the addition of carrier tags to a payload or message body may be all the encapsulation that is performed. Otherwise, as exemplified in FIG. 12, the carrier tags, and specifically the carrier tag values themselves, may be part of a larger encapsulation structure which may include other fields, addresses, delimiters and such. Carrier tags may be arranged in any manner. A carrier tag structure may or may not comprise other fields in addition to the actual carrier tag values which identify single or aggregate flows, such as tunnel labels, service emulation instance mapping identifiers, pseudowire labels, etc.

Figure 13:
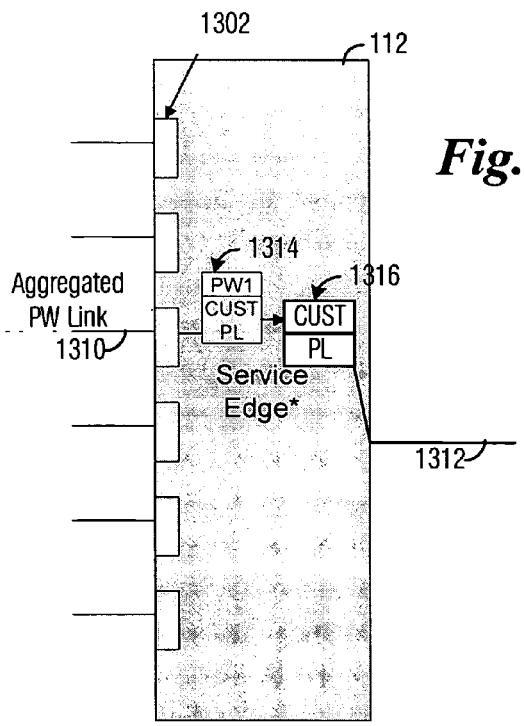
Figure 13:
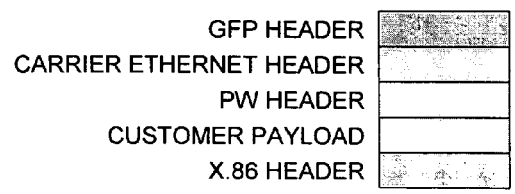
Figure 13:
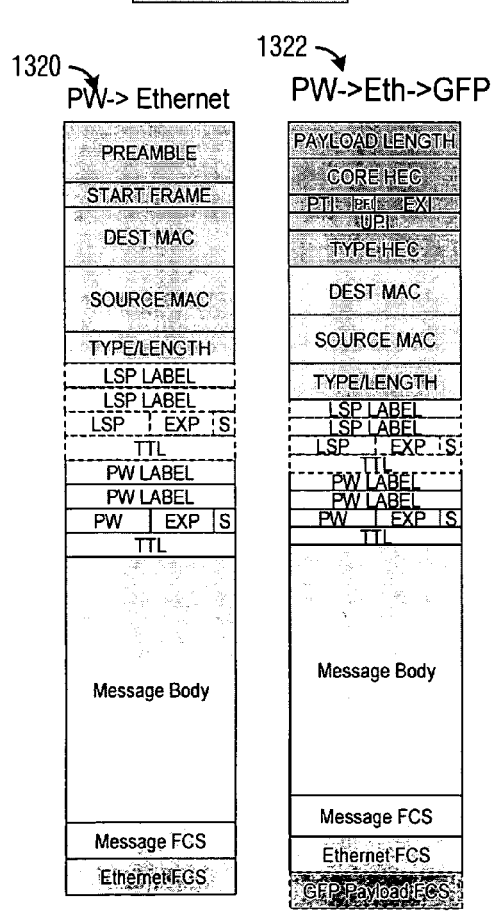

FIG. 13 illustrates framing formats in accordance with an embodiment of the present invention. In one embodiment, aggregated pseudowire flows 1310 are the flows transmitted by the layer 2 switch 118 as discussed above with reference to FIG. 12. In this situation, a decapsulation function 1302 may be performed by the service edge 114 or the service emulation terminator 130. In an environment in which the service edge 114 is incapable of or not configured for performing the decapsulation function 1302, the layer 2 switch 118 may perform the decapsulation function 1302 and substitutes another sub-interface encapsulation, such as, for example, a VLAN over a TDM or GbE interface, or the like, before forwarding the traffic to the service edge. In another situation, the access network may comprise two or more layer 2 switches interconnected. In this situation, the last layer 2 switch may decapsulate the traffic prior to passing the traffic to the service edge.

The Ethernet, Ethernet/GFP, GFP, and Ethernet/X.86 frames, represented by reference numerals 1320, 1322, 1324, and 1326, respectively, correspond to the frames 1240, 1242, 1244, and 1246, respectively, discussed above with reference to FIG. 12. Upon receipt of the aggregated pseudowire flows 1310, a decapsulation function 1302 is performed. The decapsulation function 1302 removes the header, the FCS, and other flags that may have been added during the encapsulation function related to the framing and performs error checking/frame verification procedures. As indicated by reference numeral 1314, a decapsulated flow includes a pseudowire label and the customer payload. The pseudowire label may be removed resulting in a customer payload 1316 as originally received by the access network.

It should be noted that the decapsulation function 1302 is illustrated as being performed by the service edge 114 for illustrative purposes only and that the decapsulation function 1302 may be performed by other components. For example, in one embodiment, multiple layer 2 switches may be communicatively coupled together and the service edge 114 may not be configured to perform the decapsulation function 1302. In this scenario, the layer 2 switch 118 may perform the decapsulation function before forwarding the flow to the service edge 114. In another example, a service emulation terminator 130 may be communicatively coupled between the layer 2 switch 118 and the service edge 114. In this situation, it may be desirable or necessary for the service emulation terminator 130 to perform the decapsulation function 1302. It should also be clear that, depending upon nesting practices and presence of multiple stacked carrier tags in the traffic, a decapsulation process may involve multiple stages of removing tags and encapsulation fields from traffic-bearing frames.

FIG. 13 illustrates a practice of providing at least a pseudowire label portion of a carrier-tagged frame to the service edge 112. To handle flows properly, service edge 112 may not only be concerned with the pseudowire label value to distinguish logical flows but may also need to ascertain what service type (ATM, FR, TDM, etc.) has been encapsulated by a specific pseudowire. One way to obtain this information is by storing, in a data structure, what service type is declared for a pseudowire when the pseudowire label value is initially established by LDP, for example. An alternative way involves using some of the bits in the 20-bit pseudowire label space (or more generally, a service emulation mapping instance identifier) to indicate a service type, perhaps expressing a standardized value to represent each service type as promulgated by the Internet Assigned Numbers Authority (IANA). In accordance with the present teachings which enable service-agnostic common transport and provisioning of all service types, it becomes necessary to not only identify a flow but also to identify a native service type that has been encapsulated therein. This gives rise to what may be termed a "pseudowire logical port" or a "service emulation instance logical port" involving the additional expression of encapsulated service type, which may be useful or necessary at some interfaces.

Because a service edge 112 may handle core network pseudowires and, in accordance with the present teachings, may also be able to terminate pseudowires on the access network side, the service edge 112 may couple access flows to core network flows by the "stitching together" of access-side pseudowires and core-side pseudowires. This novel aspect of the present teachings may be applicable to other types of carrier-tagged flows and service emulation instances beyond pseudowires, per se.

Figure 14:
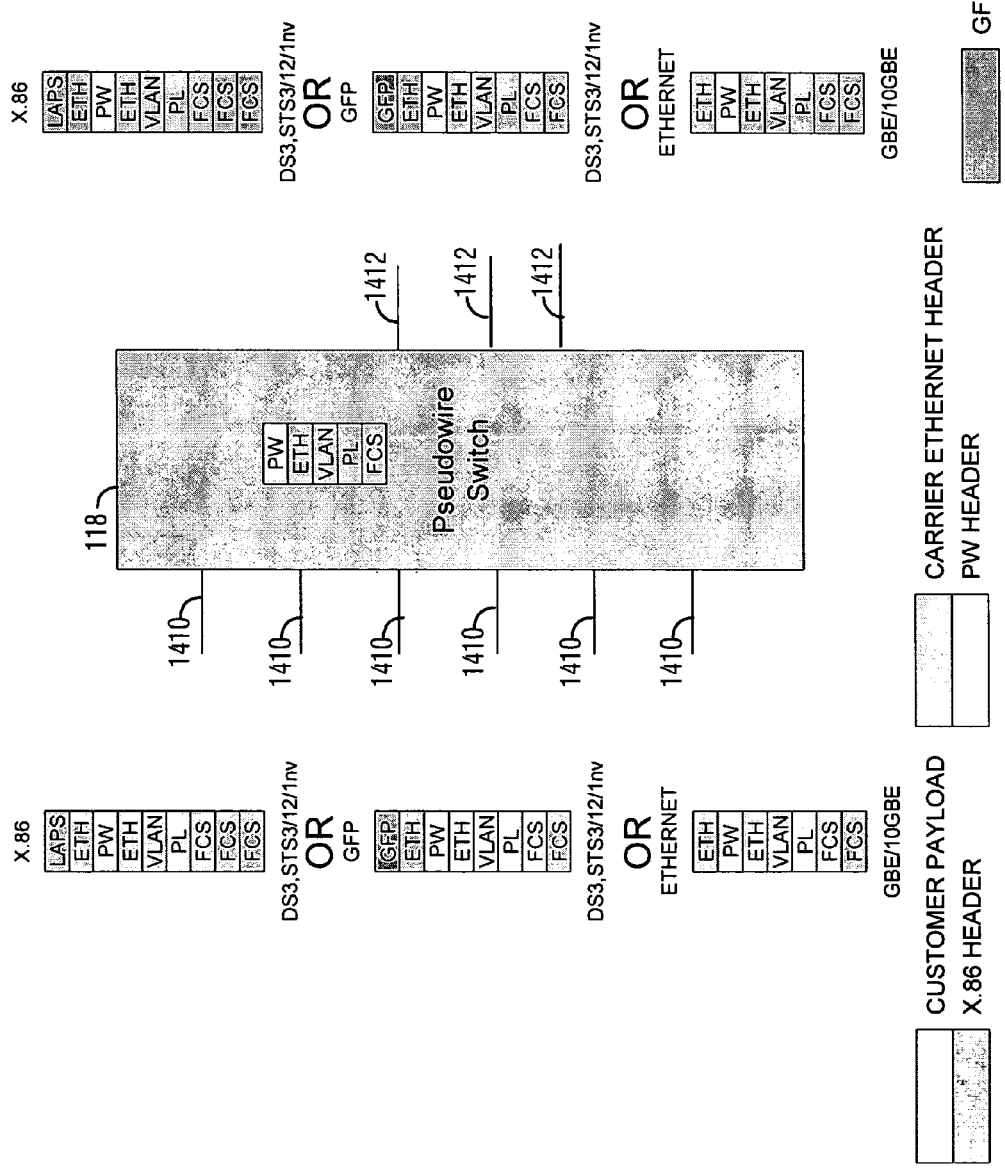

FIG. 14 illustrates framing formats in accordance with an embodiment of the present invention. FIG. 14 comprises a layer 2 switch 118 configured to perform switching functions based upon pseudowire labels. The input frames, i.e., the frames on the left side of the layer 2 switch 118, represent examples of frames that the layer 2 switch 118 may receive as input, and the output frames, i.e., the frames on the right side of the layer 2 switch 118 represent examples of frames that the layer 2 switch 118 may transmit as output. The input frames may be received on one or more aggregated pseudowire access pipes 1410, and may route the frames to any one or more of the aggregated pseudowire network pipes 1412.

It should be noted that the layer 2 switch 118 can be configured to replace the framing if necessary. For example, an X.86 frame may be received via an aggregated pseudowire access pipe 1410 and routed to an output pipe as a GFP frame over DS3. In this example, the layer 2 switch 118 would remove the X.86 framing information and replace it with the GFP framing information.

It should also be noted that the switching or routing of the messages in these cases can remain based upon the pseudowire label, or other layer 2 identifiers. The framing, such as X.86, GFP, Ethernet, or the like, may not determine the routing. Rather, the layer 2 switch 118 evaluates the pseudowire label and switches or routes the traffic accordingly. In this manner, the routing or switching decisions may be performed independent of the services used by the customer and without evaluating the customer data.

Figure 15:
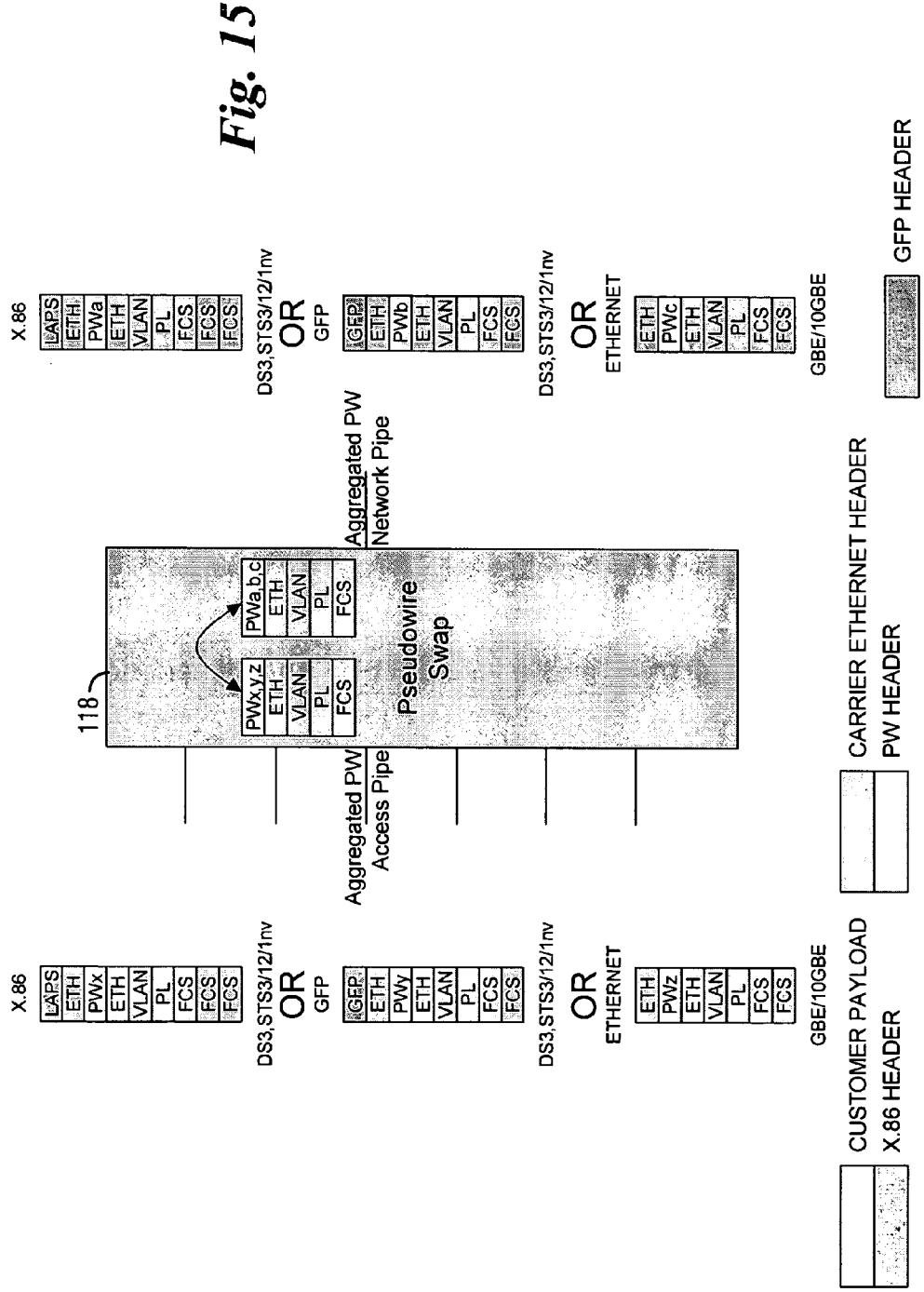

FIG. 15 illustrates a label swapping function in accordance with an embodiment of the present invention. The label switching function allows the layer 2 switch 118 to replace one service emulation instance mapping identifier with another. FIG. 15 is similar to FIG. 14, except that the pseudowire labels are switched between the input and output frames. For example, pseudowire label PWx is switched to pseudowire label PWa, pseudowire label PWy is switched to pseudowire label PWb, and pseudowire label PWz is switched to pseudowire label PWc.

Figure 16:
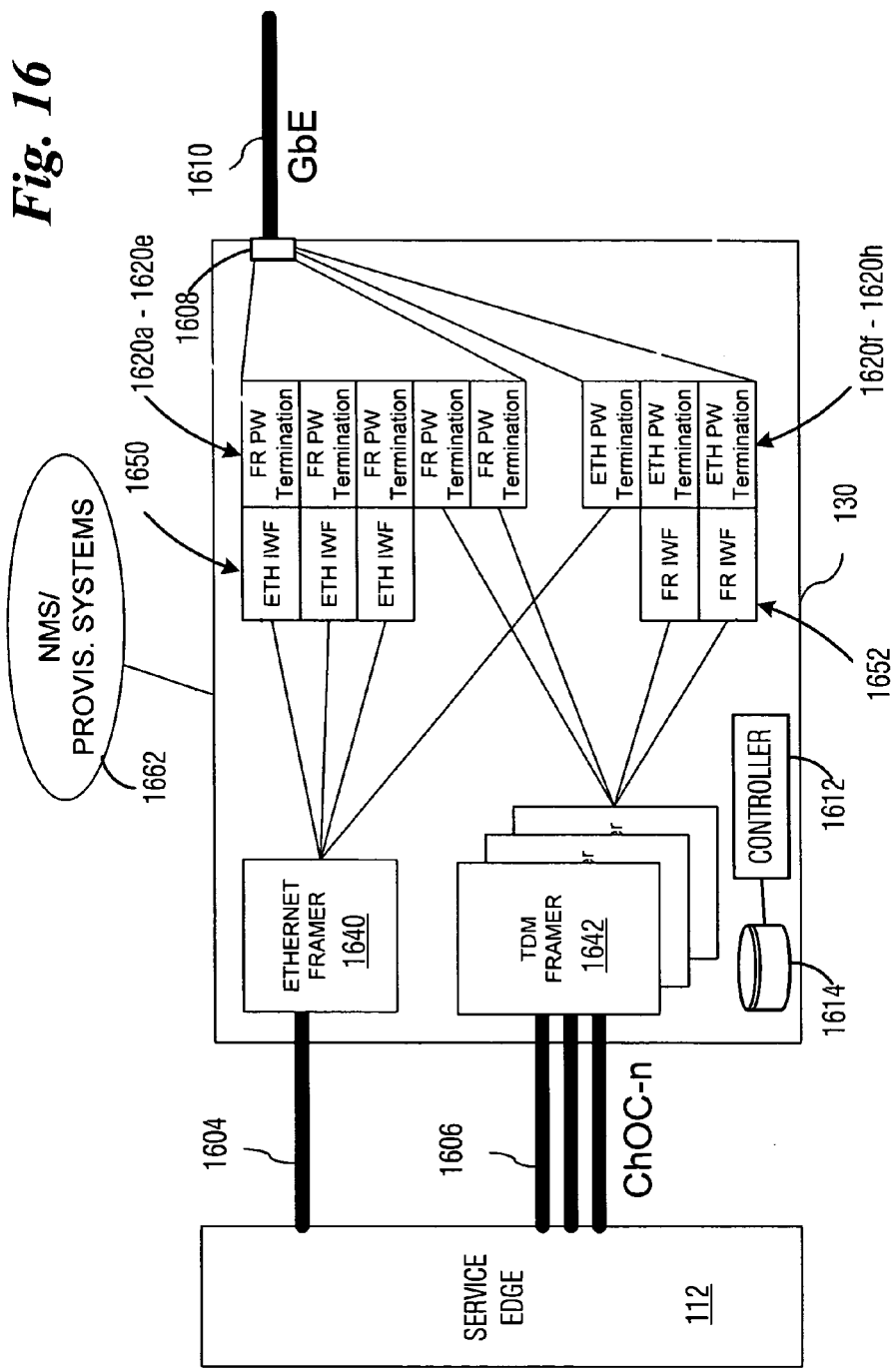
FIG. 16 illustrates the functional components of a service emulation instance terminator in accordance with an exemplary embodiment of the present invention.

FIG. 16 is a block diagram including an exemplary embodiment of a service emulation instance terminator that may be used in accordance with an embodiment of the present invention. The service emulation instance terminator 130 comprises a service emulation interface 1608 to communicatively couple to a network element in the access network via communications link 1610, which may be one or more communications link(s), such as a GbE or 10 GbE communications link from a layer 2 switch 118. Generally, the service emulation instance terminator 130 receives or transmits aggregated traffic via the communications link 1610.

The service emulation instance terminator 130 is communicatively coupled to the service edge 112 (which may comprise a plurality of network elements) via one or more communications links. In the example illustrated in FIG. 16, the service emulation instance terminator 130 is communicatively coupled to the service edge 112 via one or more GbE or 10 GbE communications link 1604 and TDM communications links 1606, such as a channelized OC-n communications link. The illustrated communications links are provided for illustrative purposes only and, accordingly, may vary for any particular embodiment of the present invention.

Each service emulation instance terminator 130 may have one or service emulation end point components that could be used to terminate service emulation communications, e.g., traffic received from or transmitted on a service emulation instance over the communications link 1610. An example of a service emulation end point is a pseudowire end point. For example, FIG. 16 illustrates an exemplary embodiment in which pseudowires are utilized to emulate frame relay services and Ethernet services. Accordingly, pseudowire end points 1620a-1620e represent service emulation end point components for pseudowires emulating frame relay services, and pseudowire end points 420f-420h represent service emulation end points for pseudowires emulating Ethernet services. Other types of service emulation end point components may be used to terminate other types of services, such as ATM services and the like.

One or more framers, such as Ethernet framer 1640 and TDM framer 1642, act as an interface to the communications links communicatively coupled to the service edge 112, e.g., communications links 1604 and 1606, respectively. The TDM framer 1642 may receive traffic from a service emulation end point component (e.g., pseudowire end points 1620) or an interworking function 1650 to format and transmit TDM traffic, such as frame relay traffic, on a TDM channel which is then passed to the service edge 112. Similarly, the Ethernet framer 1640 receives traffic from a service emulation end point component or an interworking function 1650 and also formats and transmits Ethernet traffic on an Ethernet communications link. For example, frame relay traffic may have come through a pseudowire and appear in its re-created form at the end of service emulation end point component 1620d. This frame relay traffic may then be passed to the TDM framer 1642 which puts the frame relay traffic onto a TDM channel which is then passed to the service edge over a channelized OC-n interface 1606.

The interworking function converts traffic among various types of traffic and may be dynamically configured to convert among types of traffic. For example, the Ethernet interworking function 1650 may be configured to accept frame relay traffic along pseudowire end point 1620a, to repackage the information, and as necessary, to convert any overhead information, port status information, error correction/data integrity check information, and flow control protocols to render a valid Ethernet representation corresponding to the frame relay information. The Ethernet framer 1640 may add Ethernet framing data and transmit the traffic to the service edge 112. Another example is shown as frame relay interworking function 1652 acts upon Ethernet traffic arriving along pseudowire end point 1620h and renders a frame relay representation suitable for transport via a TDM framer 1642.

The service emulation instance terminator 130 may further comprise a controller 1612 and a database 1614. The database 1614 provides storage for mapping service emulation instance mapping identifiers to particular flows, and may contain instructions regarding whether or not an interworking function and a framer are to be applied. The controller 1612 may be any general purpose or special purpose processor, such as an Application Specific Integrated Circuit (ASICs), Network Processors, Complex Instruction Set Computer (CISC), Reduced Instruction Set Computer (RISC), or the like.

In operation, the service emulation instance terminator 130 removes the service emulation instance mapping identifier that had been applied at the originating end of the service emulation instance. Similarly, traffic transmitted by the service emulation instance terminator 130 through the access network via a service emulation instance on the communications link 1610 is encapsulated, which may include removing unneeded framing information, prepending the service emulation instance mapping identifier associated with the flow, and transmitting the traffic via the service emulation instance as packet data. The service emulation end point components of a service emulation instance may involve many other operations, such as defragmentation, as will be described in greater detail below.

In the course of emulating a type of transport service, each service emulation end point component may participate in any or all of the following operations to prepare traffic for carriage over a service emulation instance or to reconstruct traffic that has been received through a service emulation instance. Service emulation end point components may perform fragmentation and reassembly to accommodate maximum transmission unit (MTU) limitations of the underlying packet switch network transport. Service emulation end point components may be involved in concatenating small frames, such as ATM cells, to form larger packets that may be more efficiently transmitted through the underlying packet switched network. Service emulation end point components may also be involved in re-ordering of frames or packets, timing/buffering, detection of duplicated or missing portions of transmission, and carriage of control signals and keep alive signals compatible with a native service being emulated.

A management and provisioning system 1662 can be communicatively coupled to the controller 1612 (or other components) of the service emulation instance terminator 130 to provide provisioning and management functionality. In response to commands received from the management and provisioning system 1662, service emulation instance terminator 130 may coordinate with other elements to resolve service emulation instance mapping identifiers, e.g., pseudowire labels, and to control the invocation of interworking functions to adapt service emulation instance access to the service edge as flexibly as possible. In this manner, the service provider is allowed considerable latitude to optimize how services are provided by the control of the service emulation instance terminator 130, especially by virtue of the flexibility afforded by the interworking functions. Whether coordinated through an external provisioning interface or by other mechanisms, an interworking function may be configured to adapt between a local customer site which may use a first type of transport and a remote customer site which may use a second type of transport different from the first. This ability to provide communications among diverse sites may be of commercial value to a service provider.

Furthermore, an interworking function may adapt between a first type of transport used by customer site and a second, different type of transport employed by a service edge or a core network. Applying interworking functions at both the service edge ingress and egress points along an end-to-end path through a core network allows a service provider to freely choose whatever form of core transport is preferred, independently of what transport type is experienced by the customer locations at either end of the path. The interworking function applied to a service emulation communications through a service emulation instance terminator 130 may be responsive to the transport type of the service emulation communications being different than the transport type associated with a core network or service edge, or different than a remote site to which communications is established through the service edge.

The advantages of implementing carrier-tagged flows described thus far may be further enhanced or complemented by maximizing the packet-carrying bandwidth of the connection to the customer site. In accordance with a preferred embodiment of the present invention, the communications link 113 to the customer sites shown in FIG. 2 and in FIG. 9 is implemented as a "huge pipe", such as a gigabit ethernet connection or an optical OC-12 link. As such, communications link 113 may be used to carry packetized communications which are, in turn, used to carry customer flows of many different layer one/layer two types. The huge pipe allows for provisioning behavior that can effectively accomplish provisioning on the level of T1, DS3, OC-3 that would normally involve manual patching of electrical or optical cables.

In some implementations according to the present teachings, this high-bandwidth pipe may be provided as an access link to a customer location and one or more customers and their respective flows may be dynamically provisioned onto a pipe as needed. By virtue of packetization and the elimination of manual touch points and grooming crossconnect switches, and for other reasons related to simplicity of switching equipment as described herein, it may be cost-effective in some implementations to deploy and manage a huge bandwidth pipe to customer locations, even if the utilization of the pipe is relatively low compared to its maximum achievable bandwidth.

As packetized access also enables segregation of customer flows via virtual private networking, these characteristics may work together in accordance with the present teachings to break the old paradigm of a "single pipe per customer" that was prevalent with T1 lines. Furthermore, it is no longer necessary that a very big pipe be deployed only to very largest customers/sites whose traffic volumes could justify it. Even with low initial bandwidth utilization, it may be more cost effective to deploy and manage an OC-12 link at 622 Mbps than to operate even a few separate TDM links of the T1 or DS3 variety. At present, having just slightly more a T1's worth of traffic volume at a site may justify the cost of a broadband connection such as an OC-3 that is implemented as described herein.

Furthermore, once a broadband physical/logical connection has been established to reach a given site, subsequent provisioning and upgrading of bandwidth is very easily accomplished for both new and existing customers. In fact, it is possible to fully automate bandwidth provisioning in response to requests from either the customer or the service provider. This bandwidth provisioning may occur on a real-time basis—that is, essentially providing a "bandwidth on demand" service that may readily shift, for example, from a miniscule DS0 rate up to an OC-n rate from one moment to the next.

In some implementations, aspects of the present invention may realize synergies between deploying very high bandwidth pipes to reach customer sites and the packetization of all traffic to form a particularly useful access solution. However, it should be noted that "huge pipe provisioning" involving gigabit Ethernet or the like is not essential to realizing benefits from the present invention. The cost effectiveness of a leased DS3, for example, may be dramatically improved in accordance with the some implementations of the present teachings.

Although the present invention and its and exemplary modes of use have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing communications between a customer premise equipment and a service edge, the method comprising:
   receiving from the customer premise equipment a first communication according to a first time-division multiplexed signal format;
   converting the first communication to a carrier-tagged communication, that is associated with a carrier tag value;
   sending the carrier-tagged communication as a packet-switched communication along a packet-switched communication path based on the carrier tag value;
   converting the carrier-tagged communication to a second communication according to a second time-division multiplexed signal format, the first time-division multiplexed signal format being different from the second time-division multiplexed signal format; and
   sending the second communication to the service edge.

2. The method of claim 1 wherein the first time-division multiplexed signal format comprises a plesiochronous digital hierarchy signal format.

3. The method of claim 1 wherein the first time-division multiplexed signal format comprises a synchronous digital hierarchy signal format.

4. The method of claim 1 wherein the second time-division multiplexed signal format comprises a plesiochronous digital hierarchy signal format.

5. The method of claim 1 wherein the second time-division multiplexed signal format comprises a synchronous digital hierarchy signal format.

6. The method of claim 1 wherein the packet-switched communication comprises ethernet communications.

7. The method of claim 1 wherein the packet-switched communication includes at least one of a packet-switched network tunnel, a service emulation instance, a pseudowire, a logical networking tagged path or a virtual local area network (VLAN) circuit.

8. The method of claim 1 wherein the packet-switched communication is transported using a third time-division multiplexed signal format.

9. The method of claim 8 wherein the third time-division multiplexed signal format comprises a synchronous digital hierarchy signal format.

10. The method of claim 1 further comprising:
   at a network element, affecting a routing of the carrier-tagged communication responsive to the carrier tag value associated therewith.

11. The method of claim 1, where the packet-switched communications path is configured for at least one of Ethernet traffic, frame relay traffic, asynchronous transfer mode traffic, or high level data link control traffic.

12. A system for providing communications between a customer premise equipment and a service edge, the system comprising:
   a time-division multiplexing fabric to route time-division multiplexed communications;
   a packet fabric to route packet-switched communications; and
   at least one time-division multiplexing to packet conversion switch to convert a first communication between a time-division multiplexed signal format and a packet-switched format based on the communication being associated with a carrier tag value;
   wherein the packet-switched communication is sent along a packet-switched communication path based on the carrier tag value;
   the carrier-tagged packet-switched communication is converted to a second communication according to a time-division multiplexed signal format different from the time-division multiplexed signal format of the first communication; and
   the second communication is sent to the service edge.

13. The system of claim 12, where communications between the time division multiplexing fabric and the packet fabric are routed based on the carrier tag value.

14. The system of claim 12, further comprising a plurality of ports configured to support different types of connections.

15. The system of claim 14, where the different types of connections include at least one of an optical link, an electrical link, or a wireless link.

16. The system of claim 12, further comprising:
   a plurality of ports configured to support at least two of:
   an Ethernet connection,
   a time-division multiplexed connection,
   a frame relay connection,
   an asynchronous transfer mode connection, or
   a high-level data link control connection.

17. A method comprising:
   receiving a first communication according to a time-division multiplexed signal format, the first communication being associated with a first carrier tag value;
   converting the first communication to a packet-switched communication based on the first communication being associated with the first carrier tag value, where the conversion of the first communication to the packet-switched communication is performed at one of a building aggregation system, a layer 2 switch, a service emulation instance terminator, or a service edge;
   sending the packet-switched communication along a packet-switched communications path;
   receiving a second communication according to a time-division multiplexed signal format, the second communication being associated with a second carrier tag value; and sending the second communication without converting the second communication to a packet-switched communication.

18. The method of claim 17, where the first carrier tag value includes a VLAN value.

19. The method of claim 17, where the first carrier tag value includes a pseudowire value.

* * * * *